United States Patent [19]

Ohi et al.

[11] Patent Number: 4,795,867
[45] Date of Patent: Jan. 3, 1989

[54] MOTOR ACTUATOR FOR AIR CONDITIONING SYSTEM

[75] Inventors: Shinichi Ohi; Shinichiro Yoshida, both of Konan, Japan

[73] Assignee: Diesel Kiki Co., Ltd., Tokyo, Japan

[21] Appl. No.: 22,939

[22] Filed: Mar. 6, 1987

[30] Foreign Application Priority Data

Mar. 11, 1986 [JP] Japan .................... 61-034962[U]
Apr. 1, 1986 [JP] Japan .................... 61-04832[U]
Apr. 22, 1986 [JP] Japan .................... 61-092522[U]
Dec. 4, 1986 [JP] Japan .................... 61-186215[U]

[51] Int. Cl.⁴ .............................................. H01H 7/00
[52] U.S. Cl. ........................... 200/37 R; 200/11 DA; 200/501
[58] Field of Search .......... 200/37 R, 1 V, 24, 164 R, 200/164 A, 11 DA, 153 V

[56] References Cited

U.S. PATENT DOCUMENTS 3,098,129 7/1963 Lynch et al. ................. 200/24 X

FOREIGN PATENT DOCUMENTS 20969 2/1983 Japan .

Primary Examiner—A. D. Pellinen
Assistant Examiner—Morris Ginsburg
Attorney, Agent, or Firm—Frishauf, Holtz, Goodman & Woodward

[57] ABSTRACT

A motor actuator for an air conditioning system comprising a driving motor and an output shaft rotated by a driving force from the driving motor. At least one moveable contact is mounted on a contact mounting member rotatable together with the output shaft. Fixed contacts are mounted on a fixed circuit board. The movable contact is in sliding contact with the fixed contacts. A hysteresis imparting device is provided for imparting a hysteresis to the rotation of the contact mounting member with respect to the rotation of the output shaft. Further, the circuit board is interposed between an output gear on the output shaft and a switch disc rotatable together with the output gear. A switch device comprised of the movable contact and the fixed contacts is mounted between the circuit board and the output gear and/or between the circuit board and the switch disc.

17 Claims, 18 Drawing Sheets

FULL HEAT ← ROTATIONAL ANGLE → FULL COOL

MOTOR ACTUATOR FOR AIR CONDITIONING SYSTEM

BACKGROUND OF THE INVENTION

This invention relates to a motor actuator for an air conditioning system which is particularly adapted for use in automotive vehicles.

Conventionally, an air conditioning system for use in automotive vehicles is generally equipped with various driven devices such as a damper for selecting recirculated air and fresh air, a compressor for compressing refrigerant to be delivered to a cooler unit, an air-mix damper for mixing dehumidified cold air from the cooler unit with warm air from a heater unit at such a ratio as to obtain a desired air discharge temperature, and mode selector dampers for selecting vent mode, bilevel mode, foot mode, and defrost mode.

An air conditioning system of this kind for automotive vehicle is, for example, constructed as shown in FIG. 1:

A recirculated/fresh air selecting damper 4 is provided between a recirculated air inlet 2 and a fresh air inlet 3 which are both arranged at an upstream end of a duct 1. The recirculated/fresh air selecting damper 4 is controlled by a first motor actuator 5 to selectively close the inlet 2 and the inlet 3. The air from the recirculated air inlet 2 or the fresh air inlet 3 is introduced into the duct 1 by a blower 6. An evaporator 7 of the cooler unit, an air-mix damper 8, a heater core 9 of the heater unit, mode selector dampers 10 and 11 are arranged in this order in the duct 1 downstream to the blower 6.

The evaporator 7 together with a compressor 12, a condenser 13, a liquid receiver 14, and an expansion valve 15 constitutes a refrigeration cycle. A driving force is transmitted to the compressor 12 from an engine pulley 16 via an electromagnetic clutch 17.

The air-mix damper 8 is for adjusting the ratio at which the cold air from evaporator 7 and the warm air from the heater core 9 are mixed, and is controlled by a second motor actuator 18. A water cock 19 is automatically opened and closed in response to the movement of the air-mix damper 8 such that the air heating rate of the heater core 9 is adjusted.

The mode selector dampers 10 and 11 are for selecting and adjusting the direction and amount of the air blown into the passenger compartment through an upper outlet 20, a lower outlet 21, and a defrost outlet 22. The dampers 10, 11 are controlled by a third motor actuator 23.

A control unit 24 is adapted to control the first motor actuator 5, the second motor actuator 18, the third motor actuator 23, a blower motor 6a for driving the blower 6, and the electromagnetic clutch 17, and comprises a blower control circuit 25, a compressor control circuit 26, a mode selector damper control circuit 27, a recirculate/fresh air selecting damper control circuit 28, and an air-mix damper control circuit 29. Further, the control unit 24 is adapted to receive signals from an air conditioner switch 30, a temperature setter 31, a discharge rate setter 32, an air discharge mode setter 33, a recirculated/fresh air selector mode setter 34 an automatic control setting switch 35, a fresh air temperature sensor 36, a recirculated air temperature sensor 37, an evaporator temperature sensor 38, etc.

However, in an air conditioning system of this kind, the necessity of providing various electric control circuits including the blower control circuit 25 causes the circuit construction to be very complicated, and in the case where these control circuits are composed of semiconductor elements, there is a fear of erroneous operation of the control circuits caused by thermal influence, noise from outside, etc.

In order to solve this problem, an arrangement has been proposed by Japanese Provisional Patent Publication (Kokai) No. 58-20969, wherein the controlling of the motor actuator for the air-mix damper 8 which directly influences the temperature in the passenger compartment is taken as the control basis such that a switch device is composed of a movable contact movable in response to movement of the air-mix damper 8 and a plurality of fixed contacts arranged opposite the movable contact, and various driven devices such as the air blower other than the air-mix damper are controlled in response to an output signal from the switch device.

However, in controlling the blower for example, in response to an output signal from such a switch device, the angular position of the output shaft of the actuator for causing the movable contact to slide on the fixed contacts is in fixed correspondence with the position of the fixed contacts, so that there occurs no hysteresis in the angular position of the output shaft with respect to the position of the fixed contacts between the time the movable contact slides from a fixed contact corresponding to a lower blower rotational speed to a fixed contact corresponding to a higher blower rotational speed, and the time the movable contact slides in the opposite direction. As a result, when the air-mix damper is operated in the vicinity of a blower speed change-over position, change-over of the blower speed takes place frequently, causing hunting in the rotation of the blower, which leads to unstable rotation of the blower and results in uncomfortable feeling to the passengers.

A switch device as described above is typically composed, as shown in FIG. 2, of a movable contact 42 provided on a lower side face of an output gear 41 rotatable by a motor 39 via a speed change device 40 and fixed contacts 45 provided on a printed circuit board 44 fixed on an actuator casing 43.

However, only one such conventional switch device is provided in the proposed conventional air conditioning system, which causes the construction of the control circuit of the air conditioning system to be complicated. Furthermore, since the switch device is provided on an upper side face of the circuit board 44, fixed contacts 45 have to be provided on the upper side face of the circuit board 44, this necessitates that the circuit board 44 should be a costly double-sided printed board because contacts to be connected with a connector, for example, are provided on the lower side face of the circuit board 44 whereas the fixed contacts 45 are provided on the upper side face of same. This disadvantage with the switch device arrangement is derived from a limited space within the air conditioning system, in which the actuator is to be arranged.

Further, another disadvantage with the switch device is penetration of grease for gear lubrication into the switch device, which is caused by the arrangement that the switch device is on the upper side face of the circuit board 44.

SUMMARY OF THE INVENTION

It is an object of the invention to provide a motor actuator for an air conditioning system, wherein the switch device for controlling driven devices is equipped with a hysteresis imparting means of a simple construction.

It is a further object of the invention to provide a motor actuator for an air conditioning system, which permits to provide a switch device between the output gear and the circuit board and/or between a switch board and the circuit board, according to necessity, thereby enabling reduction in the manufacturing cost.

It is a still further object of the invention to provide a motor actuator for an air conditioning system, wherein twice as many circuits can be incorporated as ones in the conventional actuator employing a single-sided circuit board, thereby enabling simplification of the control circuit construction of the air conditioning system and hence contribute to a further reduction in the manufacturing cost.

It is a still further object of the invention to provide a motor actuator for an air conditioning system, wherein the switch device is provided on the lower side face of the printed circuit board so as to make it possible to use a single-sided printed circuit board as the printed circuit board, thereby contributing to a reduction of the production cost, and at the same time avoiding penetration of grease into the switch device.

According to a first aspect of the invention, there is provided a motor actuator for an air conditioning system which comprises a driving motor; an output shaft rotated by a driving force from the driving motor; contact mounting means rotatable together with the output shaft; movable contact means mounted on the contact mounting means; a fixed circuit board; fixed contact means mounted on the circuit board; the movable contact means being arranged in sliding contact with the fixed contact means; and hysteresis imparting means for imparting a hysteresis to the rotation of the contact mounting means with respect to the rotation of the output shaft.

The contact mounting means comprises a first member rotatable together with the output shaft, and a second member having the movable contact means mounted thereon, and wherein the hysteresis imparting means comprises means for rendering the second member rotatable relatively to the first member through a predetermined angle.

Preferably, there is further provided means for varying the magnitude of the hysteresis in response to angular position of the output shaft.

According to a second aspect of the invention, there is provided a motor actuator for an air conditioning system which comprises a driving motor; an output shaft rotated by a driving force from the driving motor; an output gear mounted on the output shaft; a switch disc arranged in concentric relation to the output shaft and rotatable together with same; a circuit board interposed between the the output gear and the switch disc; and switch means provided on the circuit board and at least one of the output gear and the switch disc.

As a specific arrangement of the second aspect, the switch means comprises first switch means provided between the output gear and the circuit board, the first switch means being composed of the first movable contact means provided on the output gear and first fixed contact means provided on the circuit board, the first movable contact means being in sliding contact with the first fixed contact means, and second switch means provided between the switch disc and the circuit board, the second switch means being composed of second movable contact means provided on the switch disc and second fixed contact means provided on the circuit board, the second movable contact means being in sliding contact with the second fixed contact means.

As another specific arrangement of the second aspect, the output shaft extends vertically, and the switch disc is arranged below the output gear in concentric relation thereto and is rotatable together with the output gear. The movable contact means is arranged between the circuit board and the switch disc, and mounted on an upper side face of the switch disc and, on the other hand, fixed contact means is mounted on a lower side face of the circuit board. The movable contact means is in sliding contact with the fixed contact means.

The above and other objects, features and advantages of the invention will be more apparent from the ensuing detailed description taken in conjunction with the accompanying drawings.

DETAILED DESCRIPTION

Figure 1:
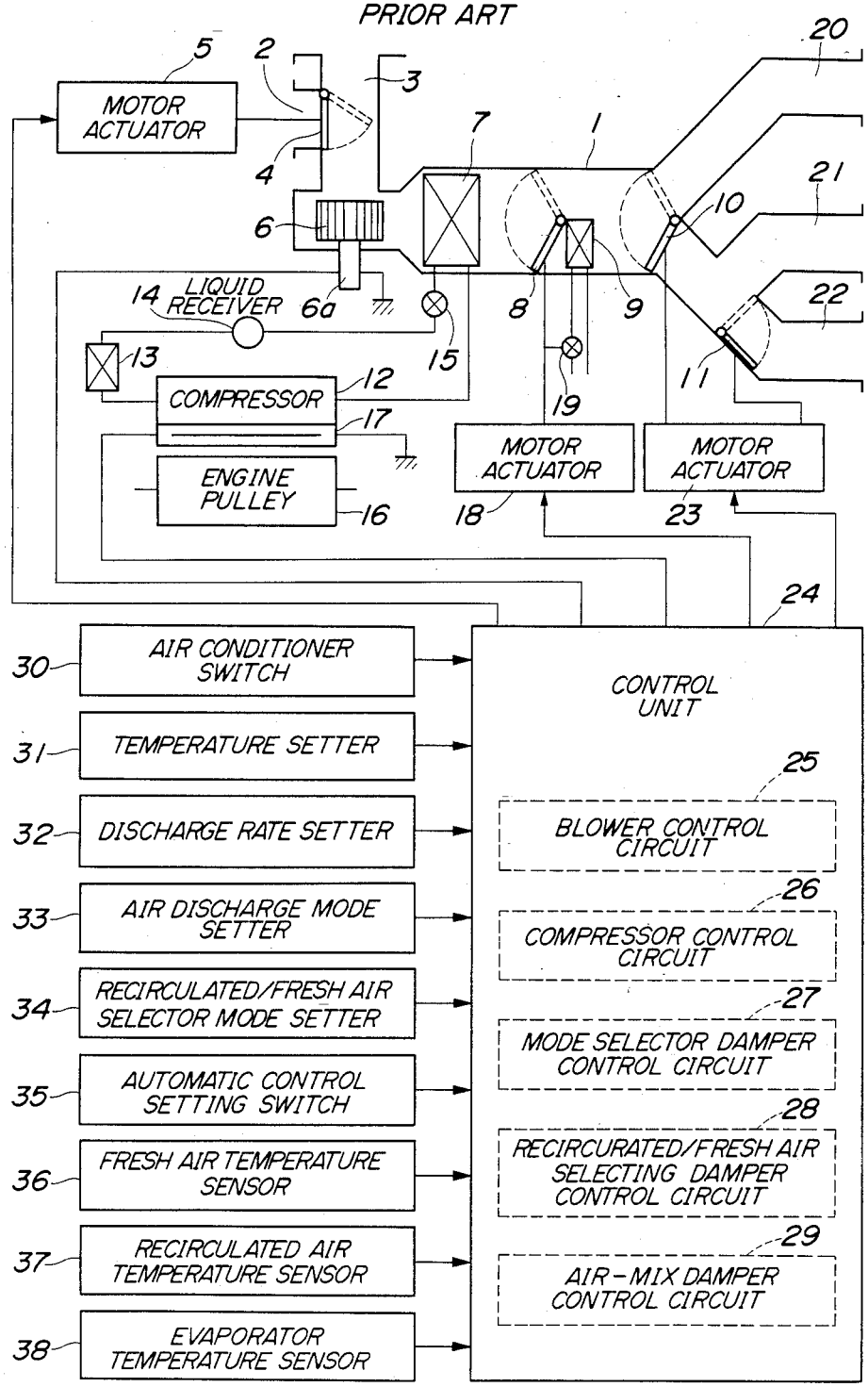
FIG. 1 is a block diagram illustrating the whole construction of a conventional air conditioning system for automotive vehicles.
Figure 2:
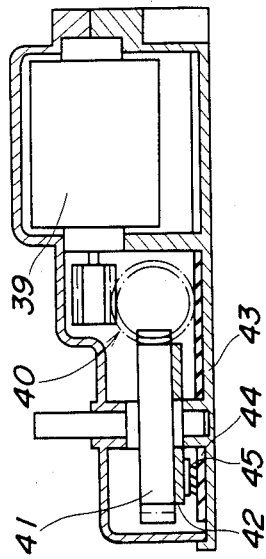
FIG. 2 is a vertical longitudinal cross-sectional view of a conventional motor actuator.

The invention will now be described in detail with reference to the drawings.

Motor actuators of first, second, and third embodiments, to be described hereinbelow, all correspond to the motor actuator 18 for controlling the air-mix damper 8, whereas a motor actuator of a fourth embodiment corresponds to all the motor actuators appearing in FIG. 1, i.e. the motor actuators 5, 18, 23.

Referring first to FIGS. 3 through 8, which show the first embodiment of the invention, a motor actuator 18' has a gear box 101 formed by an upper case 101a and a lower case 101b combined together. A gear housing 102 is formed within the gear box 101, in which a gear train 103 is accommodated as a power transmission device.

The gear train 103 includes a worm gear 105 secured on a driving shaft 104a of a driving motor 104, and a worm wheel 106 meshed with the worm gear 105. The worm wheel 106 is interlocked with an output gear 107 via a plurality of intermediate gears, e.g. 108 and 109, and is integrally formed with an output shaft 110, which extends upward to the outside of the gear box 101. An upper extended portion of the output shaft 110 is connected with coupling members (not shown) such as a link, via which the air-mix damper 8 in FIG. 1 is rotated by the rotating output shaft 110 from a full heat position (chain line in FIG. 1) to a full cool position (solid line in FIG. 1).

The driving motor 104 for driving the gear train 103 is housed in a cylindrical motor casing 111 with an end closed, and is fixed to one end wall of the gear box 101 by means of bolts or the like, not shown, with a bracket 112 interposed between the motor casing 111 and the gear box 101.

The driving shaft 104a extends from a bearing portion 104b provided at an end of the driving motor 104 and is inserted into the interior of the gear box 101 through an opening 113 formed in an end wall of the gear box 101, and the worm gear 105 is secured on the driving shaft 104a. Thus the gear train 103 is rotatively driven by the driving motor 104 to transmit the rotation of the driving motor 104 to the output shaft 110 via the output gear 107 at a predetermined reduction ratio.

Incidentally, the supply voltage to the driving motor 104 is supplied by a power source, not shown, via a connector (not shown) provided integrally with the lower case 101b, a printed circuit board 114 connected to the connector and arranged in the bottom part of the gear housing 102, and a lead wire 115 connected to the board 114.

Figure 5:
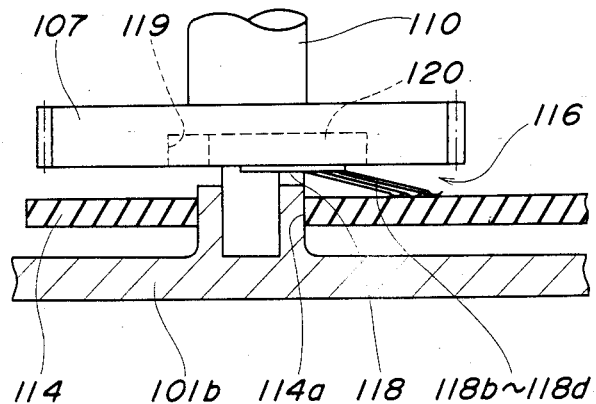
FIG. 5 is a fragmentary sectional view of the motor actuator illustrating the switch device portion.
Figure 6:
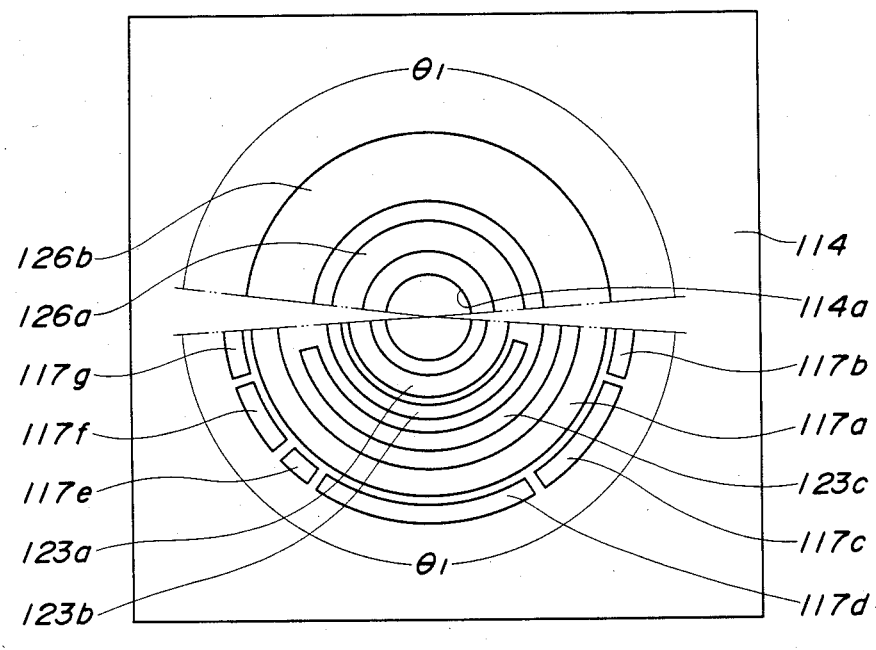
FIG. 6 is a top plan view of a printed circuit board of the motor actuator illustrating an example of the array of fixed contacts of the switch device.
Figure 7:
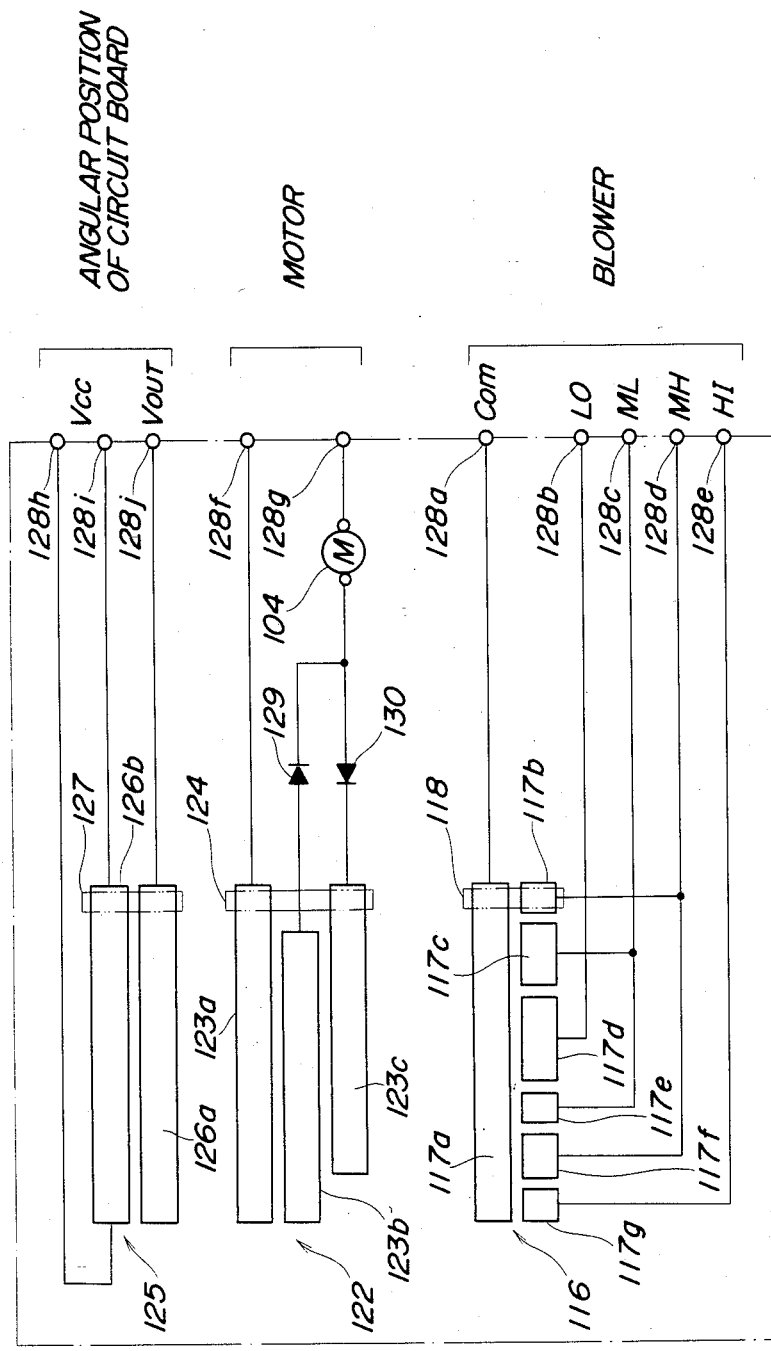
FIG. 7 is a circuit diagram showing an example of the circuit configuration of the switch device, a switch for stopping a driving motor, and a potentiometer.

In FIG. 5, reference numeral 116 designates a switch device adapted to generate rotational speed selecting signals having different voltages which are supplied to the blower 6 in FIG. 1. As shown in FIG. 7, the switch device 116 is composed of a plurality of fixed contacts 117a–117g, and a movable contact 118. The fixed contacts 117a–117g are formed on an upper side surface of the circuit board 114 by means of printing, as shown in FIG. 6. The fixed contacts 117a–117g are concentrically arranged about a central hole 114a formed in the board 114 and circumferentially extend through an angle θ1. The fixed contact 117a continuously extends through the angle θ1, so that it is always in contact with the movable contact 118 at all positions of the latter. The other fixed contacts 117b–117g are formed in splitted form and also extend through the angle θ1, having respective predetermined lengths corresponding to a speed change pattern required of the blower 6.

In the first embodiment, as shown in FIG. 5, the movable contact 118 is mounted on the lower side surface of the output gear 107 in the following manner: The lower side surface of the output gear 107 which faces the circuit board 114 is formed with an elongate sliding groove 119 extending circumferentially of the output gear 107. The sliding groove 119 has its opposite end faces shaped in the form of arcuate surfaces with a radius of curvature R1. A sliding member 120 is fitted in the sliding groove 119 for circumferential movement therein. The sliding member 120 has a thickness and a width almost equal to the depth and width of the sliding groove 119, respectively. The circumferential length of the sliding member 120 is shorter than that of the sliding groove 119 by a predetermined length. Therefore, when the sliding member 120 is biased in contact with one end of the sliding groove 119, a gap 121 is formed between the other end face of the sliding groove 119 and the opposed end face of the sliding member 120. This gap 121 extends through an angle $\theta H$ at maximum with respect to the center of the output gear 107. This angle $\theta H$ corresponds to the hysteresis amount required by the selecting signal generated by the switch device 116. The sliding member 120 has its opposite end faces shaped in the form of arcuate surfaces with a radius of curvature R2, which is smaller than the radius of curvature R1 of the opposite end faces of the sliding groove 119 (R2<R1). Consequently, when the sliding member 120 is biased toward each end face of the sliding groove 119, its opposed end face does not contact the end face of the groove 119 over the whole end surface areas so that the sliding member 120 is never caught in the arcuate end faces of the sliding groove 119 and, therefore, is not hindered from leaving the end faces of same. Therefore, when the output gear 107 rotates in the direction of causing the sliding member 120 to move away from each end face of the sliding groove 119, the sliding member 120 can smoothly slide in the above direction in the sliding groove 119.

The movable contact 118 is mounted on the lower side surface of the the sliding member 120, by screws, for example. The movable contact 118 is cut out from a metal sheet into a shape shown in FIG. 4, and comprises a base portion 118a, and a common contact 118b and change-over contacts 118c and 118d, which all extend integrally from one end edge of the base portion 118a substantially circumferentially of the output gear 107. The common contact 118b slides on the fixed contact 117a, while the change-over contacts 118c and 118d slide on the fixed contacts 117b through 117g.

In FIG. 7, reference numeral 122 designates a switch for starting and stopping rotation of the driving motor 104. The switch is composed of fixed contacts 123a through 123c provided on the upper side surface of the circuit board 114, and a slider 124 fixed on the opposed lower side face of the output gear 107 by screws, for example. The fixed contact 123a continuously circumferentially extends through the angle $\theta 1$ with respect to the central hole 114a of the circuit board 114, so that it is always in contact with the slider 124 at all positions of the latter.

The fixed contact 123b, as shown in FIG. 6, uninterruptedly circumferentially extends through an angle smaller than the angle $\theta 1$ through which the fixed contact 123a extends, with respect to the central hole 114a, in such a manner that the right end of the fixed contact 123b is located at the same circumferential position with that of the right end of the fixed contact 123a. The fixed contact 123c circumferentially extends through an angle smaller than the angle $\theta 1$ with respect to the central hole 114a, with its right end located at the same circumferential position with that of the right end of the fixed contact 123a.

Figure 4:
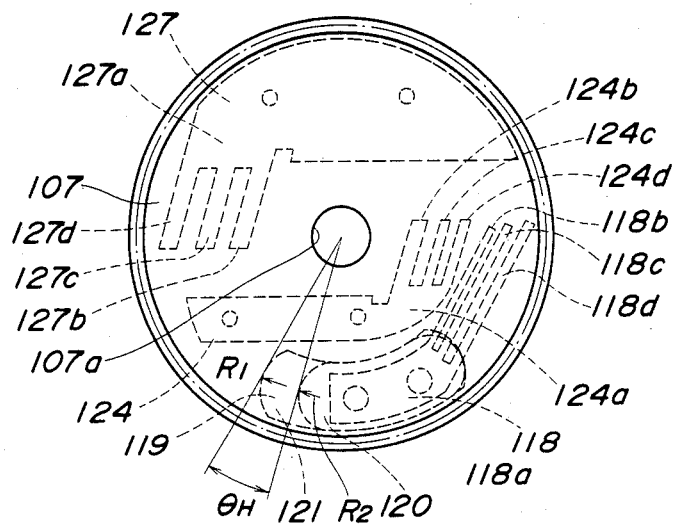
FIG. 4 is a top plan view of an output gear of the motor actuator illustrating a switch device provided in the motor actuator.

The slider 124 forming the switch for the driving motor 104 is cut out from a metal sheet into a shape similar to that of the movable contact 118 as shown in FIG. 4, and comprises a base portion 124a, and contacts 124b, 124c, and 124d, extending integrally from the base portion 124a. The contact 124b slides on the fixed contact 123a, while the contacts 124c and 124d slide on the fixed contacts 123b and 123c, respectively.

In FIG. 7, reference numeral 125 designates a potentiometer for detecting the angular position (rotational angle) of the output shaft 110, that is, the rotational angle of the air-mix damper 8 in FIG. 1. The potentiometer 125 is composed of a fixed contact 126a, a resistive fixed contact 126b whose surface is coated with a resistive material, and a slider 127. The fixed contact 126a and the resistive fixed contact 126b continuously circumferentially extend through the angle $\theta 1$ with respect to the central hole 114a so that they are always in contact with the slider 127 at all positions of the latter.

The slider 127 of the potentiometer 125 is cut out from a metal sheet into a shape as shown in FIG. 4, and comprises a base portion 127a, and contacts 127b, 127c, and 127d extending integrally from the base portion 127a. The contact 127b slides on the fixed contact 126a, while the contacts 127c and 127d slide on the resistive contact 126b. The slider 127 of the potentiometer 125 is fixed on the output gear 107 by screws, for example.

FIG. 7 shows an electric circuit configuration of the switch device 116, the switch 122, and the potentiometer 125.

As shown in FIG. 7, the fixed contact 117a of the switch device 116 is connected to the common contact 128a, the fixed contact 117d to a low speed (Lo) terminal 128b, the fixed contacts 117e, 117c to a moderately low speed (ML) terminal 128c, the fixed contacts 117b, 117f to a moderately high speed (MH) terminal 128d, and the fixed contact 117g to a high speed (HI) terminal 128e, respectively. As the movable contact 118 moves, the conduction degree between the common contact 128a and the other terminals 128b through 128e varies. These terminals 128a through 128e are connected to the external blower control circuit 25 (FIG. 1), which is adapted to control the rotational speed of the blower in response to the conduction degree between the common contact 128a and the other terminals 128c through 128e.

In the switch 122 for starting and stopping the driving motor, the fixed contact 123a is connected to a terminal 128f, the fixed contact 123b to the anode of a diode 129, and the fixed contact 123c to the cathode of a diode 130. The cathode of the diode 129 and the anode of the diode 130 are both connected to a terminal of the driving motor 104. The other terminal of the driving motor 104 is connected to a terminal 128g. These terminals 128f and 128g are connected to the actuator control circuit 29 for the air-mix damper 8 in FIG. 1, which is adapted to change the rotational direction of the driving motor 104 via the terminals 128f, 128g, and also adapted to start and stop the driving motor 104 in response to the output signal from the potentiometer 125.

In the potentiometer 125, the resistive fixed contact 126b has its one end connected to a terminal 128h and the other end to a terminal 128i, respectively, and the fixed contact 126a has its one end connected to a terminal 128j. These terminals 128h through 128j are connected to the above-mentioned actuator control circuit 29 such that when direct current voltage Vcc is applied between the terminals 128h and 128i, and voltage Vout is generated at the terminal 128j, which corresponds to the position of the slider 127 of the potentiometer 125. The actuator control circuit 29 is adapted to control the operation of the driving motor 104 in a feedback manner responsive to the generated voltage Vout.

The operation of the actuator of the above construction is described hereinbelow:

Let it be assumed that the output gear 107 and the sliding member 120 are in the positions as shown in FIG. 4. In the switch device 116, the fixed contact 117a and 117b are shorted to each other, so that the common terminal 128a and MH terminal 128d (FIG. 7) are electrically connected to each other. As a result, the rotational speed of the blower 6 (FIG. 1) is set to the moderately high speed MH by means of the blower control circuit 25.

Figure 8:
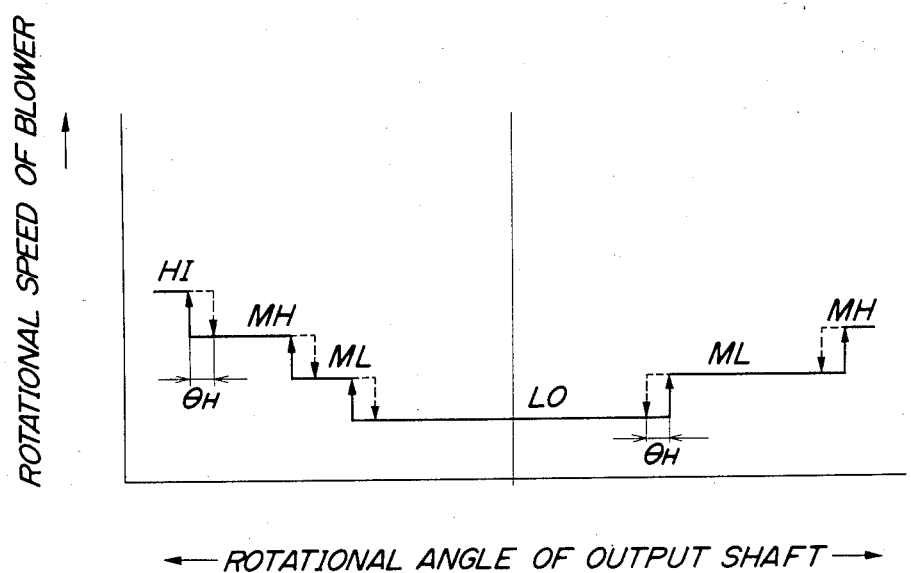
FIG. 8 is a graph showing the relationship between the rotational speed of the blower and the rotational angle of the output shaft of the motor actuator according to blower control by the use of the motor actuator of the first embodiment.

FIG. 8 shows the relationship between the rotational angle of the output shaft 110 and the blower speed, and the situation described above corresponds to the region designated as MH at the right end of FIG. 8.

In the switch 122 for starting and stopping the driving motor (FIG. 7), the slider 124 assumes a position beyond the right end of the fixed contact 123b so that the conduction between the fixed contacts 123a and 123b is interrupted. The actuator control circuit (not shown) determines the polarity of the supply voltage to be applied through the driving motor 104 in response to the connection status between the fixed contacts 123a, 123b, and 123c, and the supply voltage thus determined is supplied to the driving motor 104 via the diode 130, fixed contact 123c, the slider 124, and the fixed contact 123a. As a result, the driving motor 104 is caused to rotate in a direction corresponding to the polarity of the supply voltage until the slider 124 moves beyond the left end of the fixed contact 123c.

In the potentiometer 125, the slider 127 assumes a position at the right ends of the fixed contact 126a and the resistive fixed contact 126b, as viewed in FIG. 4. Assuming that the terminal 128h is grounded and the terminal 128i is connected to the positive terminal of the power source Vcc then the maximum voltage Vout=-Vmax is generated at the terminal 128j. This voltage Vmax is supplied to the actuator control circuit 29 as the voltage corresponding to the full heat position of the air-mix damper 8.

When the output gear 107 rotates anticlockwise, as viewed in FIG. 4, because of the gap 121 corresponding to the angle $\theta$H being formed between the left end face of the sliding groove 119 and the opposed left end face of the sliding member 120, as shown in FIG. 4, the sliding member 120 does not move in the circumferential direction simultaneously with the anticlockwise movement of the output gear 107, and the movable contact 118 temporarily stays at the position of the fixed contact 117b. To realize this, the frictional coefficient between the sliding member 120 and the sliding groove 119 is smaller than that between the common contact 118b and change-over contacts 118c, 118d of the movable contact 118 and the fixed contact 117b, so that in spite of the rotation of the output gear 107 the movable contact 118 remains unmoved for a period corresponding to the rotational angle $\theta$H of the output gear 107. Therefore, the change-over point of the blower speed displays a hysteresis characteristic corresponding to the angle $\theta$H, as shown (right-hand broken line in FIG. 8), with respect to the change-over point during clockwise rotation of the output gear 107 (right-hand solid line in FIG. 8).

In the potentiometer 125, the value of Vout gradually decreases as the output gear 107 rotates anticlockwise.

The output gear 107 further rotates anticlockwise and when the slider 124 of the switch 122 for starting and stopping the driving motor assumes a position beyond the left end of the fixed contact 123c, then the power supply to the driving motor 104 via the diode 130 and the fixed contact 123c is interrupted. At the same time, the actuator control circuit 29 reverses the polarity of the voltage to be applied to the driving motor 104, so that each time the actuator control circuit effects the power supply to the driving motor 104, the output gear 107 is caused to rotate in the reverse direction, i.e. clockwise.

On this occasion, the blower speed is set to the highest speed HI, and at the same time, the output voltage Vout of the potentiometer 126 becomes minimum, where the air-mix damper 8 assumes the full cool position.

Next, when the output gear 107 rotates clockwise, as viewed in FIG. 4, because of the gap 121 corresponding to the angle $\theta$H being formed between the right end face of the sliding groove 119 and the opposed right end face of the sliding member 120, the sliding member 120 does not move in the circumferential direction simultaneously with the clockwise movement of the output gear 107, and the movable contact 118 temporarily stays at the position of the fixed contact 117g. That is, as mentioned before, the frictional coefficient between the sliding member 120 and the sliding groove 119 is smaller than that between the common contact 118b and the change-over contacts 118c, 118d of the movable contact 118 and the fixed contact 117g, so that in spite of the rotation of the output gear 107 the movable contact 118 remains unmoved for a period corresponding to the rotational angle $\theta$H of the output gear 107. Therefore, the change-over point of the blower speed displays a hysteresis characteristic corresponding to the angle $\theta$H, as shown (left-hand broken line in FIG. 8), with respect to the clockwise rotation of output gear 107 (left-hand solid line in FIG. 8).

Figure 3:
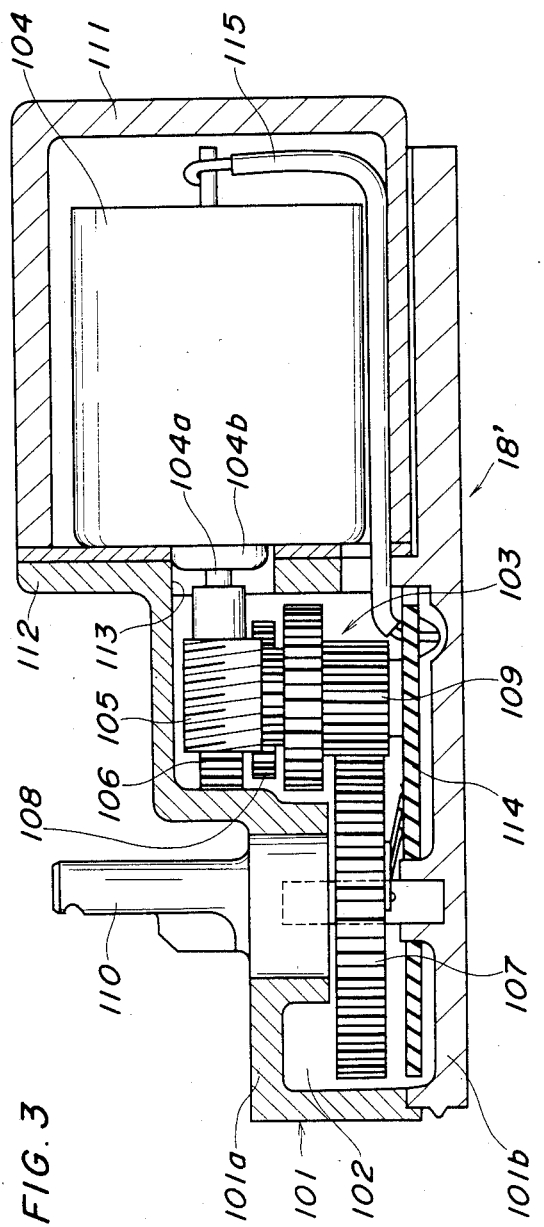
FIG. 3 is a vertical longitudinal cross-sectional view of a motor actuator according to a first embodiment.

FIGS. 9 through 19 show variations of the first embodiment, wherein corresponding elements and parts to those in FIGS. 3 through 5 are designated by like reference numerals, and description of which are omitted.

Figure 9:
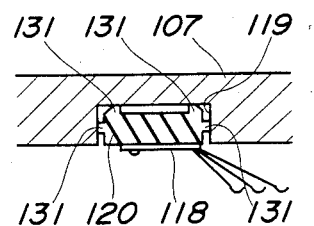
FIG. 9 is a sectional view illustrating a first variation of the first embodiment.
Figure 10:
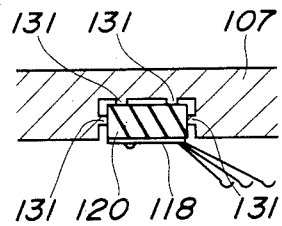
FIG. 10 is a sectional view illustrating a second variation of same.

In FIG. 9, reference numeral 131 designates sliding protuberances formed on either side surface of the sliding member 120 as well as on a surface of the member 120 opposed to the groove 119. FIG. 10 shows sliding protuberances 131 formed on a bottom surface and opposite lateral side surfaces of the sliding groove 119 of the output gear 107. These protuberances serve to reduce the friction between the sliding groove 119 and the sliding member 120.

Figure 11:
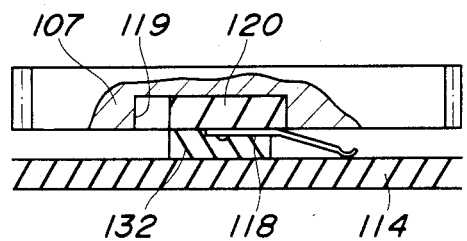
FIG. 11 is a sectional view illustrating a third variation of same.
Figure 12:
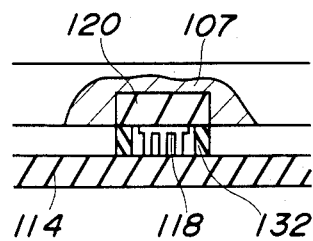
FIG. 12 is a sectional view illustrating a practical example of the third variation of same.
Figure 13:
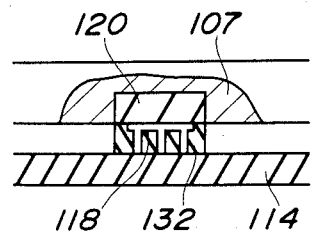
FIG. 13 is a sectional view illustrating another practical example of the third variation of same.

FIG. 11 shows an example where a resilient member 132 is interposed between the sliding member 120 and the circuit board 114 in order to enable the sliding member 120 to slide more smoothly in the sliding groove 119. Two such resilient members 132 may be provided only on opposite lateral side edges of the movable contact 118 (FIG. 12), or one such resilient member 132 may be interposed between the sliding member 120 and the board 114 so as to cover the movable contact 118 entirely (FIG. 13).

Figure 14:
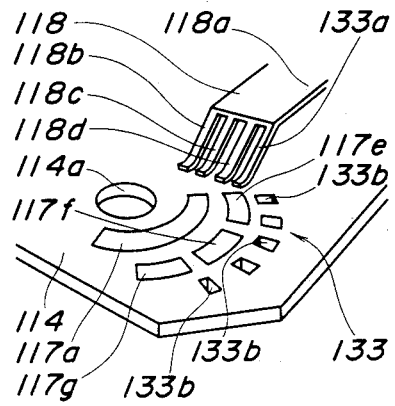
FIG. 14 is a perspective view illustrating a fourth variation of the first embodiment.

FIG. 14 shows detent means 133 comprising an engaging leg 133a and engaging holes 133b. The engaging leg 133a extends integrally from the base portion 118a of the movable contact 118 in parallel with and in the same direction as the the contacts 118b through 118d, and an engaging protuberance 134 is integrally formed on the lower side face of tip of the engaging leg 133a (FIG. 15).

The engaging holes 133b are formed through the circuit board 114 at locations corresponding to the orbital path of the engaging leg 133a.

Figure 16:
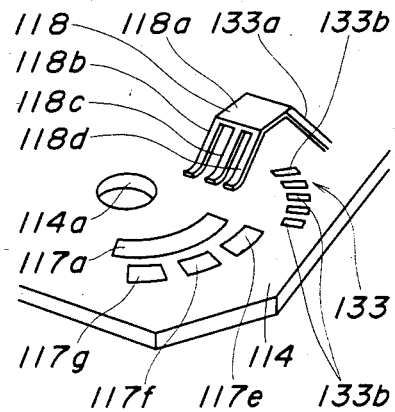
FIG. 16 is a perspective view illustrating a fifth variation of the first embodiment.
Figure 17:
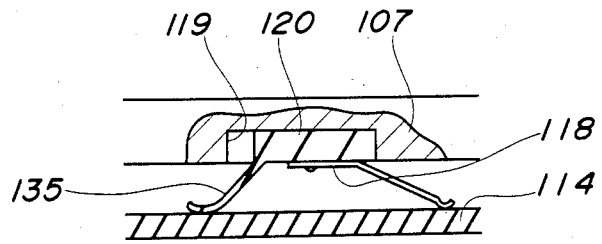
FIG. 17 is a sectional view illustrating a sixth variation of same.
Figure 18:
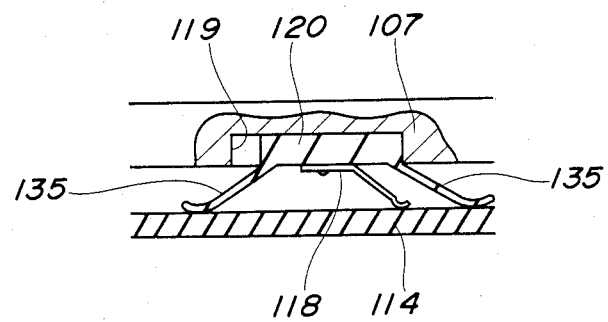
FIG. 18 is a sectional view illustrating a seventh variation of same.

FIG. 16 shows an example where the engaging leg 133a extends from an opposite edge of the base portion 118a to the edge from which the contacts 118b through 118d extend. FIGS. 17 and 18 show examples where the sliding member 120 has one sliding leg 135, in the former case, and a pair of same, in the latter, disposed to slide on the upper side face of the board 114 so as to maintain sufficient friction between the sliding member 120 and the board 114, whereby the sliding member 120 can easily slide in the sliding groove 119.

Figure 15:
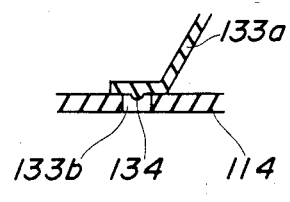
FIG. 15 is a sectional view illustrating an essential part of the fourth variation.
Figure 19:
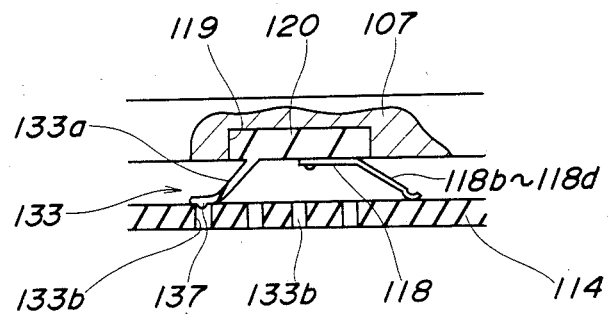
FIG. 19 is a sectional view illustrating an eighth variation of same.

FIG. 19 shows an example where an engaging leg 133a' similar to those shown in FIGS. 14 through 16 is formed integrally with the sliding member 120.

FIGS. 20 through 25 show a second embodiment of the invention, which differs from the first embodiment in that the sliding groove 119 and the sliding member 120 in the first embodiment are superseded by a sectorial recess 216 formed in the output gear 107 and a sectorial sliding member 218 which rotatively engages with the recess 216. In this embodiment, corresponding elements and parts to those of the first embodiment are designated by like reference numerals, and description of which is omitted.

The sectorial recess 216 is defined by a step 215 in a lower side face of the output gear 107 opposed to the circuit board 114. The sectorial sliding member 218 is fitted in the recess 216. The step 216 has a pair of radially extending straight stopper portions 215a and 215b, which determine the maximum rotatable range of the sliding member 218.

As noted above, the sliding member 218 has a sectorial shape like the recess 216, but the angle through which the former 218 circumferentially extends is smaller than that of the latter 216 by a predetermined angle $\theta H$. Therefore, the circumferential length of an arcuate portion 218c of the sliding member 218 is set such that a gap 219 of angle $\theta H$ is defined between one side surface 218a or 218b of the sliding member 218 and a corresponding stopper portion 215a or 215b of the step 215 when the sliding member 218 is biased with its other side surface 218b or 218a in contact with other stopper portion 215b or 215a. The angle $\theta H$ corresponds to the hysteresis amount to be possessed by a change-over signal generated by a switch device 226, hereinafter described.

Figure 21:
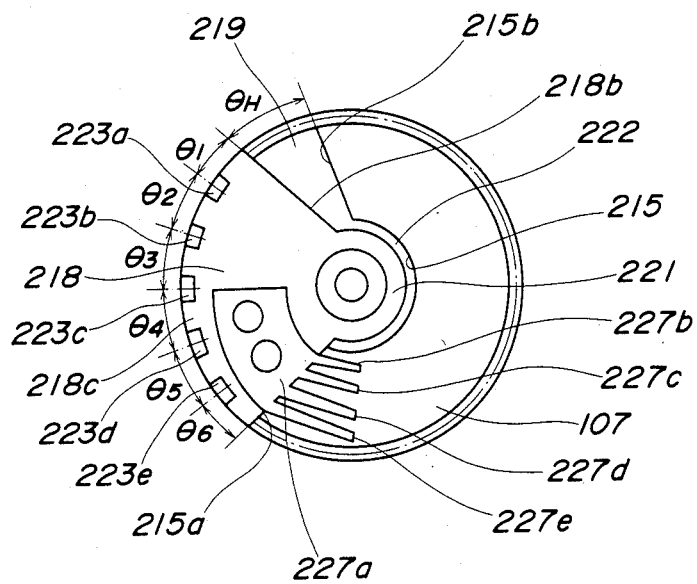
FIG. 21 is a bottom plan view of an output gear in FIG. 20 illustrating a switch device provided in the motor actuator of FIG. 20.
Figure 22:
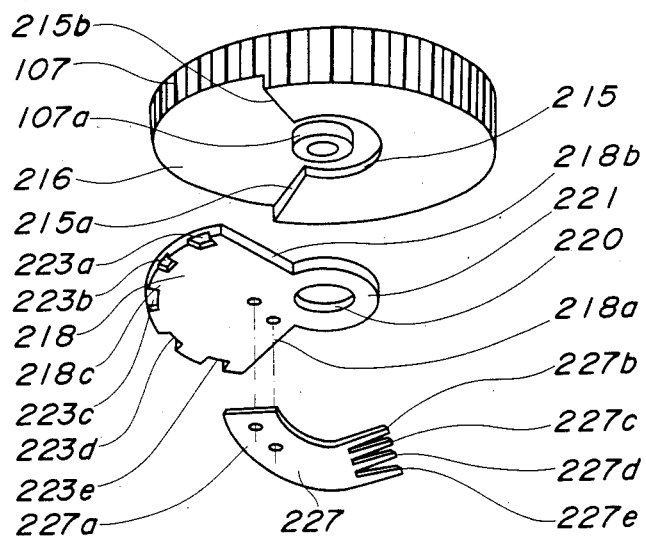
FIG. 22 is an exploded perspective view of the output gear.
Figure 23:
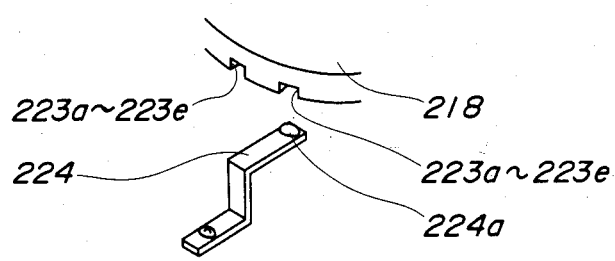
FIG. 23 is a perspective view of a detent device provided in the switch device.

An engaging hole 220 is formed in the sliding member 218, in which engages a boss 107a protruding from a central portion of the output gear 107. This engaging hole 220 is defined by a fulcrum portion 221, whose radius of curvature is slightly smaller than the radius of curvature of an arc formed by a central portion of the step 215 in the output gear 107 which surrounds the fulcrum portion 221, such that a gap 222 is defined between the fulcrum portion 221 and the step 215, as shown in FIG. 21.

The arcuate portion 218c of the sliding member 218 has a lower peripheral side edge remote from the output gear 107, which is formed with a plurality of notches 223a-223e circumferentially arranged at predetermined intervals.

Figure 20:
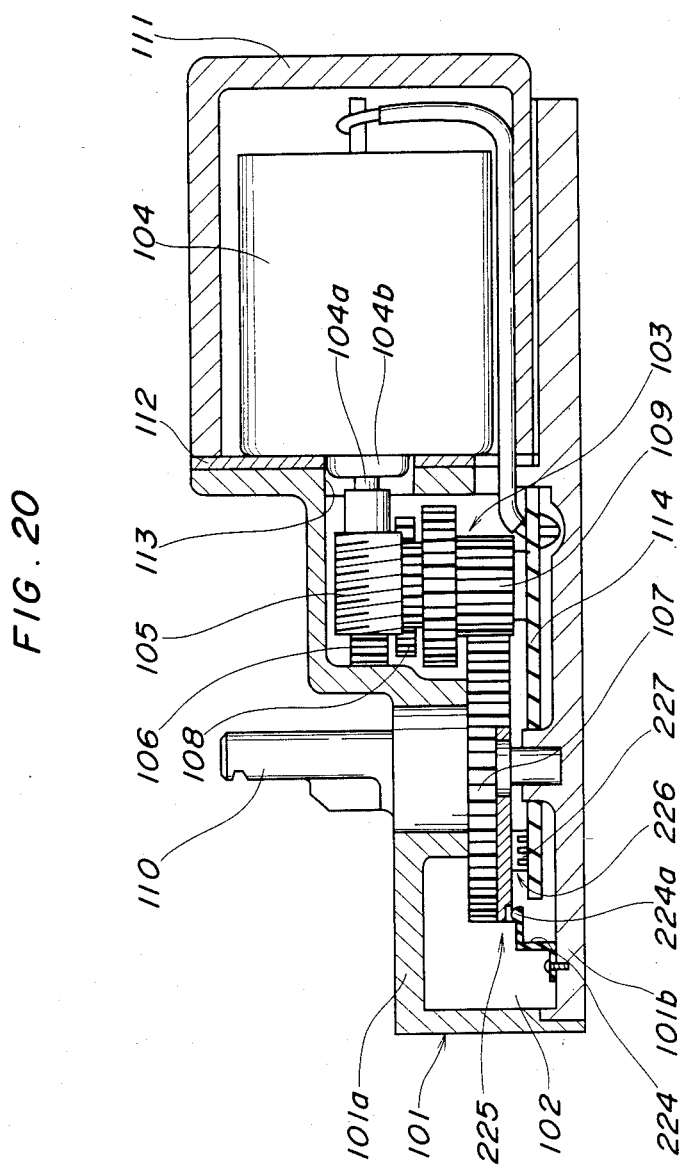
FIG. 20 is a sectional view of the motor actuator according to a second embodiment of the invention.

As shown in FIG. 20, one end of an engaging arm 224 is secured to the lower case 101b by means of screws or the like, and the other end of the engaging arm 224 is engageable with the notches 223a-223e. The engaging arm 224 together with the notches 223a-223e constitutes a detent means 225. An engaging protuberance 224a is formed on the other end of the engaging arm 224, and is adapted to engage with the notches 223a-223e.

Figure 25:
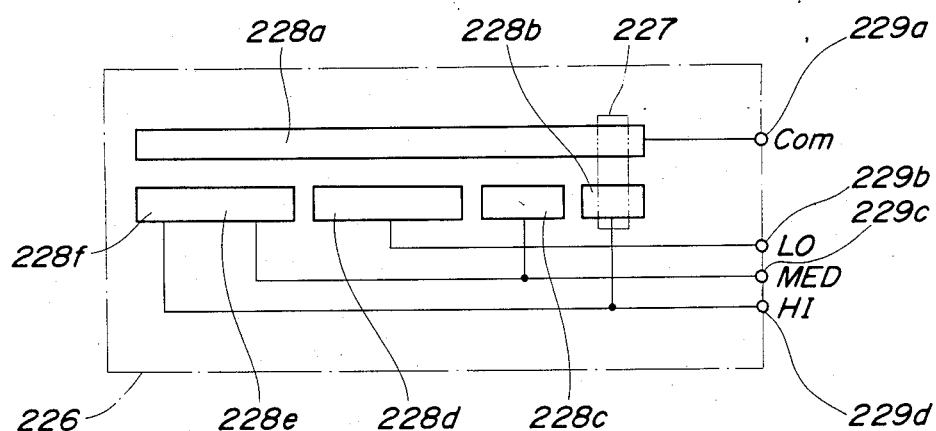
FIG. 25 is a circuit diagram of the switch device.

In FIGS. 20 and 25, reference numeral 226 designates a switch device composed of a movable contact 227 and fixed contacts 228a-228f.

The movable contact 227 is secured to the lower side face of the sliding member 218 by means of screws or the like. The movable contact 227 is cut out from a metal sheet similarly to the movable contact 118 in the first embodiment and is composed of a flat base portion 227a, and two common contacts 227b and 227c and two change-over contacts 227d and 227e, which integrally extent from the base portion 227a. The common contacts 227b and 227c slide on a fixed contact 228a, and the change-over contacts 227d and 227e slide on fixed contacts 228b–228f, to be described later.

Figure 24:
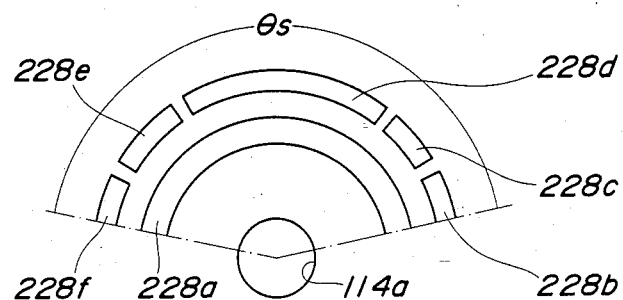
FIG. 24 is a view illustrating an example of the array of fixed contacts of the switch device.

The fixed contacts 228b–228f are provided on the upper side face of the board 114 opposed to the movable contact 227 by means of printed circuit, for example. As shown in FIG. 24, the fixed contacts 228b–228f are successively arranged through a predetermined angle $\theta s$ about the central hole 114a formed in the board 114. The fixed contacts 228b–228f are formed in a split fashion through the angle $\theta s$ with their respective lengths in accordance with the change-over pattern of the requisite rotational speed of the blower shown in FIG. 1.

FIG. 25 illustrates a circuit of the switch device 226. In FIG. 25, the fixed contact 228a is connected to a common (Com) terminal 228a, the fixed contact 228d to a low speed (LO) terminal 229b, the fixed contacts 228c and 228e to a median speed (MED) terminal 229c, and the fixed contacts 228b and 228f to a high speed (HI) terminal 229d, respectively. These terminals 229a–229d are connected to the blower control circuit 25 illustrated in FIG. 1.

The operation of the motor actuator of the above construction is described below.

First, it is assumed that the sliding member 218 is in the position illustrated in FIG. 21 where the movable contact 227 is located on the right end position of the fixed contacts 228b–228f as shown in FIG. 24 or FIG. 25, i.e., the change-over contacts 227d and 227e are located on the fixed contact 228b. In this state, the engaging arm 224 is positioned on a portion of the sliding member 218 near one side surface 218b thereof.

On this occasion, the common (Com) terminal 229a and the HI terminal 229d are made conductive to each other, so that the rotational speed of the blower is set to the maximum speed HI on the cool side.

Figure 26:
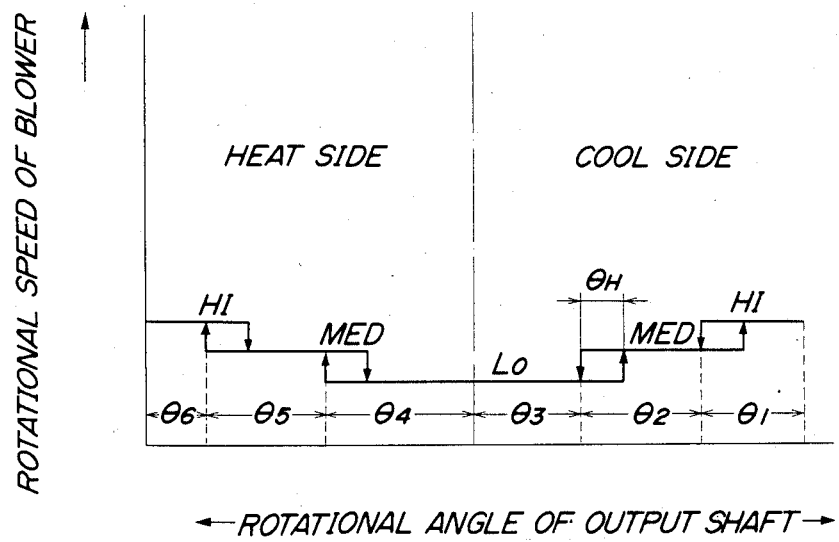
FIG. 26 is a graph similar to FIG. 8 according to blower control by the use of the motor actuator of the second embodiment.

FIG. 26 illustrates the relationship between the rotational speed of the blower and the angular position of the output shaft 110. The above-described maximum speed HI corresponds to the right hand end portion of the graph in FIG. 26.

Next, when the output shaft 110 angularly moves clockwise as viewed in FIG. 21 from the position where the movable contact 227 is located on the left ends of the respective fixed contacts 228a and 228f in FIG. 24, the gap 219 of the angle $\theta H$ formed between the side surface 218b of the sliding member 218 and the stopper portion 215b does not cause the sliding member 218 to slide on the fixed contacts 228a and 228f during angular movement of the output shaft 110 through the angle $\theta H$ until the stopper portion 215b abuts against the side surface 218b, because the coefficient of friction between the engaging arm 224 snd the sliding member 218 is higher than that between the output gear 107 and the sliding member 218. Once the output gear 107 has angularly moved through the angle $\theta H$, the movable contact 227 also angularly moves together with the angular movement of the output gear 107. As the movable contact 227 moves through an angle $\theta 6$, the change-over contacts 227d and 227e shifts from the fixed contact 228f to the fixed contact 228e, so that the rotational speed of the blower is changed over to the median speed (MED). Because of the gap 219, this change-over point shifts through the angle θH with respect to the rotational position of the output shaft 110, from the change-over point during the anticlockwise movement of the output gear 107 (refer to FIG. 26). At this time, the protuberance 224a on the engaging arm 224 engages with the notch 223e. Accordingly, thereafter the movable contact 227 slides on the fixed contacts 228e-228b together with the angular movement of the output gear 207, and the change-over of the rotational speed of the blower takes place in response to the sliding positions of the movable contact 227 (refer to FIG. 26).

Incidentally, each of the other change-over points shifts through the angle θH with respect to the rotational position of the output shaft 110 from a corresponding change-over point during the anticlockwise movement of the output gear 107.

Figure 27:
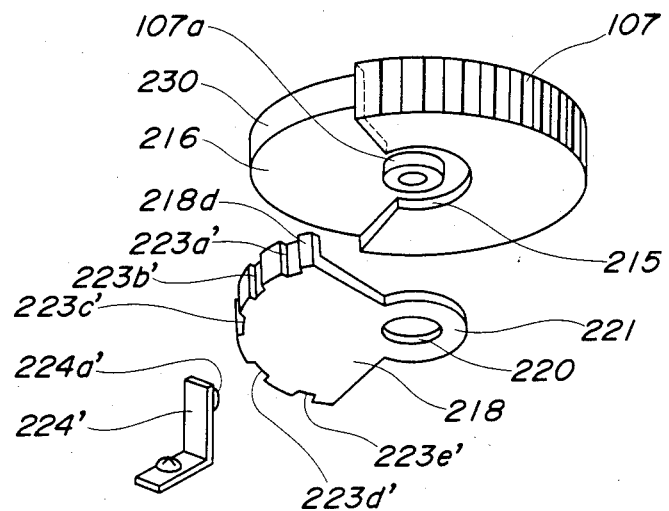
FIG. 27 is a view similar to FIG. 22 showing a variation of the second embodiment.

FIG. 27 illustrates a variation of the above-described described second embodiment, which is different from the second embodiment in that a tooth broken-away section 230 is formed in a portion of the outer peripheral surface of the output gear 107, an outer peripheral edge of the sliding member 218 is bent upwardly in an L-shape to form an arcuate extension 218d axially extending from the outer peripheral edge, and an inner peripheral surface of the extension 218d abuts against an outer peripheral surface of the tooth broken-away section 230. Axially grooves 223a'-223e' are formed in an outer peripheral surface of the extension 218d in circumferentially spaced relation. An engaging protuberance 224a' on an engaging arm 224' is adapted to engage with the axial grooves 223a'-223e'.

FIGS. 28 through 34 illustrate a third embodiment of the invention, which is different from the above-described first and second embodiments in that the magnitude of the hysteresis varies in response to the angular position of the output shaft. In FIGS. 28 through 34, corresponding elements and parts to those of the first and second embodiments are designated by like reference numerals, and description of which is omitted.

The output shaft 110 drivingly connected to the air-mix damper 8 is rotatably supported in a boss 355 on the upper case 101a by means of a bearing 343. The output shaft 110 has its lower end portion formed integrally with the output gear 107.

The printed circuit board 114 is provided above the output gear 107 and is fixedly secured to the upper and lower cases 101a and 101b. The printed circuit board 114 has its upper side face formed with a conductive pattern of a fixed contact 349. The fixed contact 349 is composed, for example, of a group of fixed contacts 349a for controlling the blower motor 6a, a group of fixed contacts 349b for controlling the second motor actuator 23 of the mode selector dampers 10 and 11, a group of fixed contacts 349c controlling the compressor 12, and a group of fixed contacts 349d for a stopper circuit which is for interrupting the input to the driving motor 104 when the air-mix damper 8 is moved into the full heat or full cool position, to thereby prevent burn-out of the driving motor 104.

The printed circuit board 114 has its lower side face formed with a resistive pattern of contacts 350 of a potentiometer for detecting the position of the air-mix damper 8.

Movable contacts 351 in contact with the contacts 350 are provided on the upper side face of the output gear 107, and movable contacts 352 in contact with the fixed contacts 349 are provided on a lower side face of a contact mounting member 353. The fixed contact 349 and the movable contacts 352 are combined with each other to form a switch device which, in response to the normal and reverse rotation of the output shaft 110, is adapted to perform the driving control of other driving devices such as the blower motor 6a, the compressor 12, the recirculated/fresh air selecting damper 4, the mode selector dampers 10 and 11 and the like other than the air-mix damper 8.

The contact mounting member 353 is rotatably supported by the movable contacts 352 provided on the lower side face of the contact mounting member 353 so as to abut against an annular projection 354 formed on the inner surface of the upper case 101a.

A hysteresis setter 356 is provided between the contact mounting member 353 and the boss 355 of the upper case 101a. The hysteresis setter 356 is biased upwardly in FIG. 28 by a coiled compression spring 357 interposed between the hysteresis setter 356 and the output gear 107 so that the hysteresis setter 356 is abutted against the boss 355.

Figure 30:
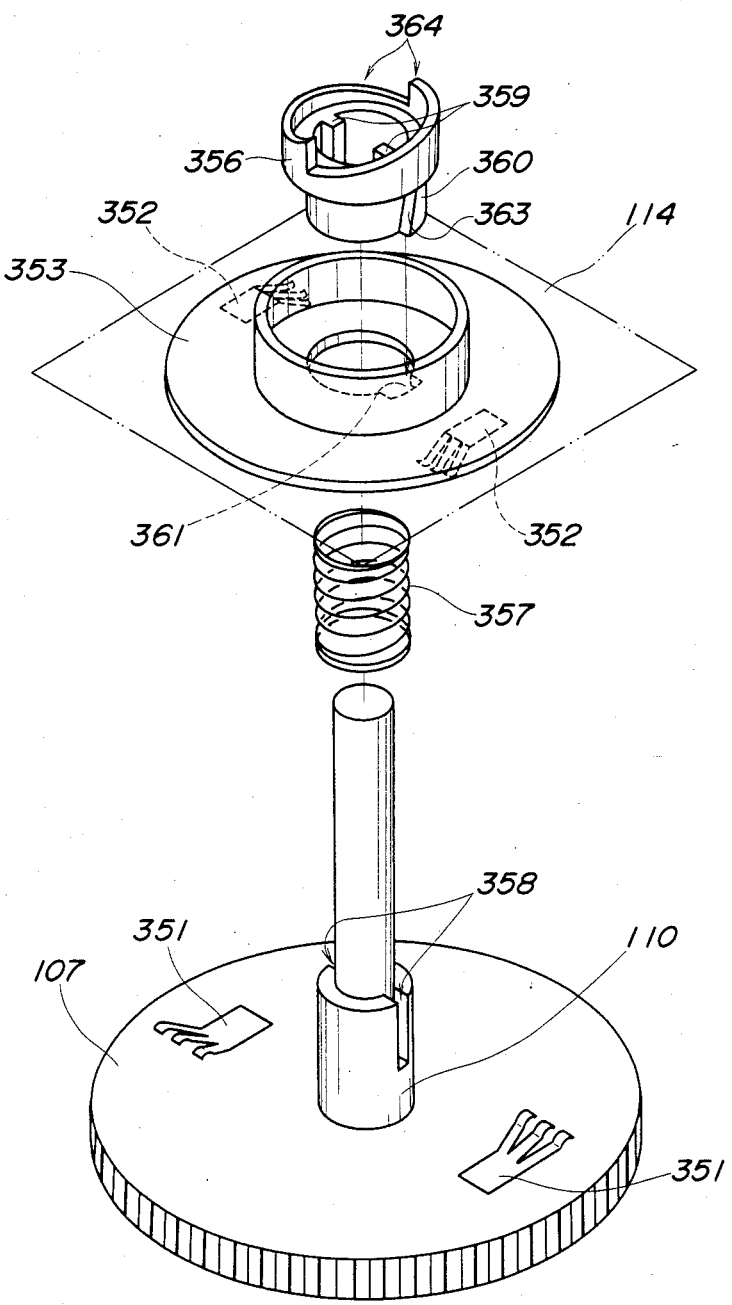
FIG. 30 is an exploded perspective view of essential parts of the motor actuator.

The hysteresis setter 356 and the associated components will be described with reference to FIG. 30. FIG. 30 is an exploded view showing the output gear 107, the printed circuit board 114, the contact mounting member 353 and the hysteresis setter 356. A pair of axially extending keys 359 are formed on a central hole in the hysteresis setter 356, and engage with a pair of key grooves 358 formed in the output gear 107 in the axial direction. Thus, the engagement of the keys 359 with the key grooves 358 enables the hysteresis setter 356 to angularly move with grooves 358 and enables the hysteresis setter 356 to angularly move together with the output shaft 110.

The contact mounting member 353 is fitted on the output shaft 110 for free rotation relative thereto in concentric relation to the hysteresis setter 356. An engaging pawl 360 is formed on an outer peripheral surface of a lower portion of the hysteresis setter 356 so as to extend radially outwardly from the outer peripheral surface. An engaging groove 361 engageable with the engaging pawl 360 is formed in the contact mounting member 353.

Figure 31:
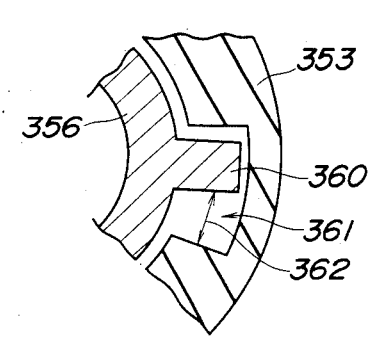
FIG. 31 is an enlarged horizontal cross-sectional view illustrating an engaging pawl and an engaging groove of the motor actuator.
Figure 32:
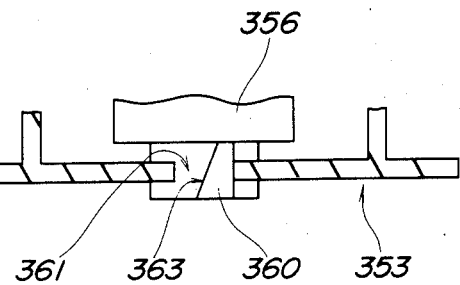
FIG. 32 is an enlarged vertical longitudinal cross-sectional view illustrating the engaging pawl and the engaging groove of the motor actuator.

FIGS. 31 and 32 show, in detail, the engagement between the engaging pawl 360 and the engaging groove 361. The engaging groove 361 is greater in size than the engaging pawl 360 so as to provide a gap 362 therebetween (refer to FIG. 31). A longitudinally extending inclined step 363 (FIG. 32) is formed on the outer peripheral surface of the engagng pawl 360 so that the size of the gap 362 between the engaging pawl 360 and the inner end wall of the engaging groove 361 is determined in dependence upon the relative position between the engaging pawl 360 and the engaging groove 361 in the axial direction of the output shaft 110.

Figure 33:
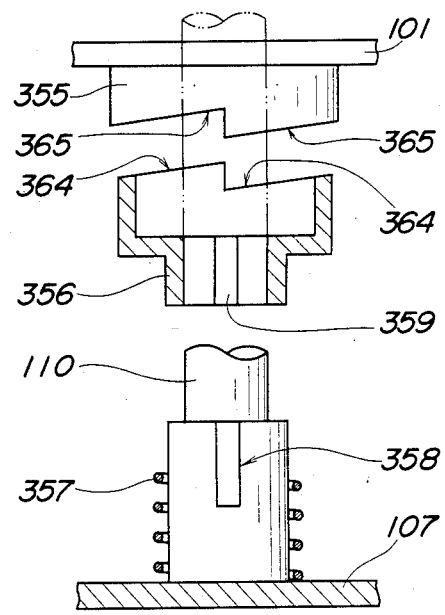
FIG. 33 is a cross-sectional side view, partly in section, of essential part of the motor actuator showing a cam face of the engaging pawl and a cam face of an upper case of the motor actuator.

As shown in FIG. 33, the hysteresis setter 356 has its upper end surface formed with a pair of cam faces 364 gradually increasing in height from their respective one ends to the other ends. Cam faces 365 corresponding in configuration to the cam faces 364 and engageable with same are formed on opposing portions of a lower surface of the boss 355 on the inner surface of the upper case 101a. Thus, in a normal condition, the cam faces 364 and 365 engage with each other over their entire areas and are steady under the state shown in FIG. 28 which shows the full cool position of the air-mix damper 8, for example.

The operation of the third embodiment of the above construction is described below with reference to FIG. 34.

Figure 28:
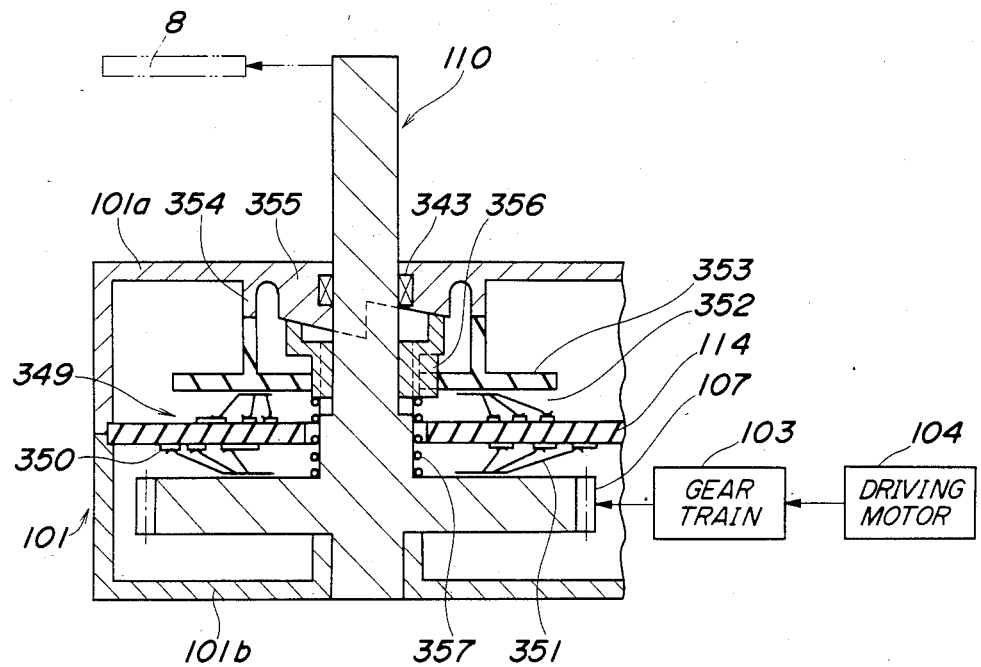
FIG. 28 is a vertical longitudinal cross-sectional view illustrating essential part of the motor actuator of the third embodiment of the invention.
Figure 29:
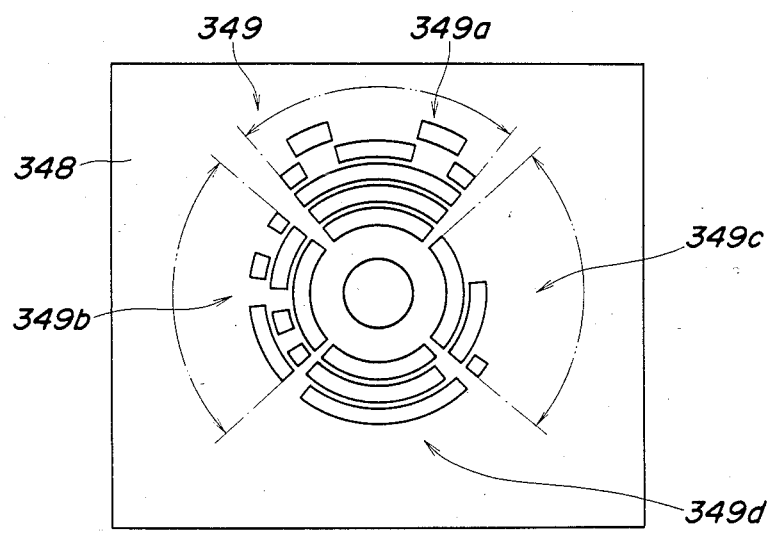
FIG. 29 is a top plan view of the printed circuit board showing the array of the fixed contacts of the switch device of the third embodiment.
Figure 34:
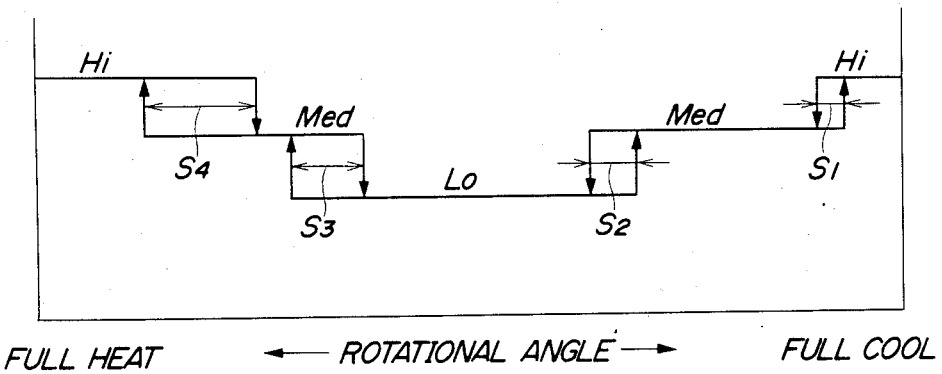
FIG. 34 is a graph similar to FIG. 8 according to blower control by the use of the motor actuator of the third embodiment.

FIG. 34 illustrates the relationship between the rotational speed of the blower motor 6a of the blower 6 as one of the above-described various driven devices and the rotational angle of the output shaft 110. When the air-mix damper 8 is in the full cool position, the cam faces 364 on the hysteresis setter 356 completely engage with the cam faces 365 on the upper case 101a, as shown in FIG. 28, so that, as shown in FIG. 32, the hysteresis setter 356 is in a relatively high position where the engaging pawl 360 engages with the engaging groove 361 with the minimum gap 362 left therebetween.

Under the above condition, as the driving motor 104 is driven to rotate the output shaft 110 through the gear train 103 in order to vary the opening degree of the air-mix damper 8, the rotatively driving force from the output shaft 110 is transmitted to the hysteresis setter 356. If the engaging pawl 360 is in engagement with the engaging groove 361, the rotatively driving force is transmitted to the contact mounting member 353 so that the latter angularly moves through a predetermined angle. Consequently, the movable contacts 353 on the contact mounting member 353 slide in contact with the fixed contacts 349 on the printed circuit board 348. Thus, the driving level of the blower motor 6a is changed from the high (Hi state to the medium (Med) state in accordance with the conductive pattern of the group of fixed counters 349a for the control of the blower motor 6a, of the fixed contacts 349.

Since the gap 362 is provided between the engaging pawl 360 on the hysteresis setter 356 and the engaging groove 361 in the contact mounting member 353, however, the start of the rotation of the contact mounting member 353 is delayed, correspondingly to the gap 362, with respect to the rotation of the hysteresis setter 356 following rotation of the output shaft 110. Accordingly, the contact mounting member 353 is not started in rotation simultaneously with the start of rotation of the output shaft 110, i.e., the hysteresis setter 356, and the movable contacts 352 do not slide on the fixed contacts 349. Therefore, a hysteresis is given which has a blind band S1 as shown in FIG. 34.

In a matter similar to that described above, when the driving wheel of the blower motor 6a shifts from the median state to the low (Lo) state and is again returned to the high state so that the full heat position is reached, the output shaft 110 repeatedly rotates in the normal and reverse directions, so that there is provided a hysteresis having blind bands S1, S2, S3 and S4.

Thus, during rotation of the hysteresis setter 356 following rotation of the output shaft 110, the cam faces 364 on the upper surface of the hysteresis setter 356 are pushed by the cam faces 365 on the boss 355 of the upper case 101a against the upward biasing force of the spring 357 so that the hysteresis setter 356 moves downwardly in FIG. 28. This causes the engaging pawl 360 of the hysteresis setter 356 to be lowered, to thereby gradually enlarge the gap 362 between the engaging pawl 360 and the engaging groove 361 in the contact mounting member 353.

The movement of the cam faces 364 away from the cam faces 365 increases the following delay of the contact mounting member 353 with respect to the rotation of the hysteresis setter 356, i.e., delays the start of rotation of the contact mounting member 353. Thus, the respective hysteresis amounts shown in FIG. 34 gradually increase as the air-mix damper 8 moves from the full cool position toward the full heat position. That is, the blind bands gradually increase from S2 toward S4.

In this manner, since the hysteresis amount is made variable in dependence upon change in the angular position of the air-mix damper 8, comfortable feeding can always be attained between the full cool position and the full heat position.

Specifically, as a preferable temperature adjustment that the passengers actually feel, the feel would be better if the temperature adjustment is effected as soon as possible under the cooling condition and, conversely, if temperature adjustment is not effected frequently under the heating condition. Moreover, it would be preferable for some types of air conditioning systems to vary the above-described hysteresis in accordance with conditions or states, according to positions and configurations of the air discharge outlets or other characteristics of the air conditioning system. The third embodiment can meet these requirements.

Incidentally, of course the engaging pawl 360 formed on the hysteresis setter 356 and the engaging groove 361 formed in the contact mounting member 353 may be formed on the contact mounting member 353 and in the hysteresis setter 356, respectively. Furthermore, the engaging pawl 360 may be formed into various configurations in dependence upon characteristic and capacity required of an air conditioning system mounted on a vehicle.

Figure 35:
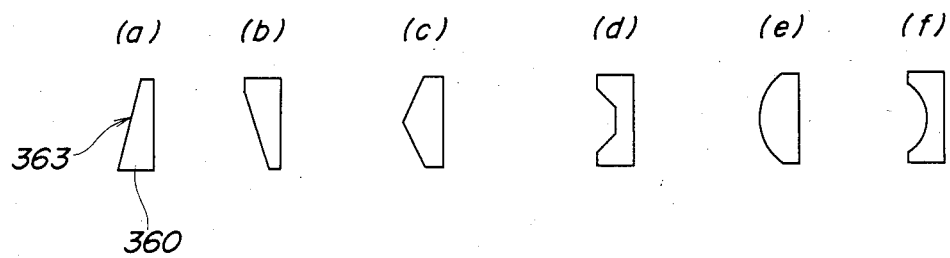
FIG. 35 is a side view illustrating further examples of a slanted face of the engaging pawl.

For example, as shown in FIG. 35, the engaging pawl 360 may take various forms. FIG. 35(a) shows the engaging pawl 360 having the inclined step 363 described with reference to the third embodiment. FIG. 35(b) illustrates an engaging pawl having an inclined step opposite in direction of inclination to that shown in FIG. 35(a). FIG. 35(c) illustrates an engaging pawl having a triangular step in which a central portion of the step projects laterally. FIG. 35(d) illustrates an engaging pawl having a step in which a trapezoidal recess is formed at a center thereof. FIG. 35(e) illustrates an engaging pawl having a step in which a center thereof projects in an arcuate form. FIG. 35(f) illustrates an engaging pawl having a step in which an arcuate recess is formed at a center thereof. Of course, it is natural that the configurations of the cam faces 364 and 365 have to suitably be designed in accordance with the selection of these engaging pawls 360.

Furthermore, the inclined step may be formed on either one or each of the engaging pawl and the engaging groove.

Moreover, the cam means such as cam faces 364 and 365 may be formed on the contact mounting member 353 in place of being formed on the hysteresis setter 356.

FIGS. 36 through 39 show a fourth embodiment of the invention, which provides an imrovement in the printed circuit board on which the fixed contacts of the switch device are provided. In the fourth embodiment, corresponding elements and parts to those of the first to third embodiments are designated by like reference numerals, and description of which is omitted.

Figure 36:
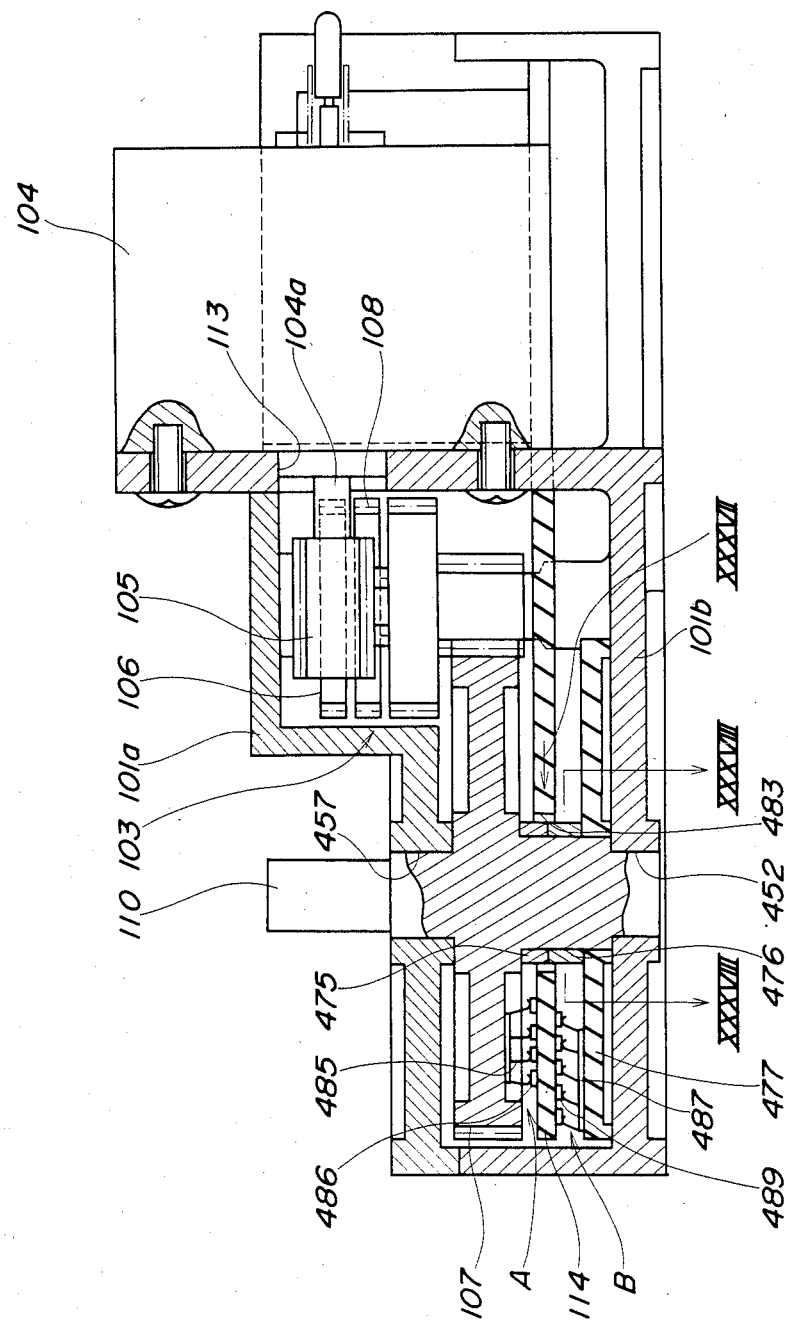
FIG. 36 is a vertical longitudinal cross-sectional view of the the motor actuator according to a fourth embodiment of the invention.
Figure 37:
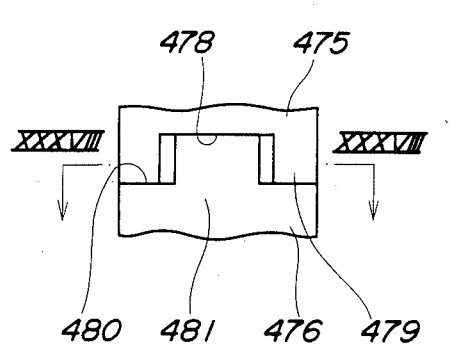
FIG. 37 is a perspective view, as viewed in the direction of XXXVII in FIG. 36.
Figure 38:
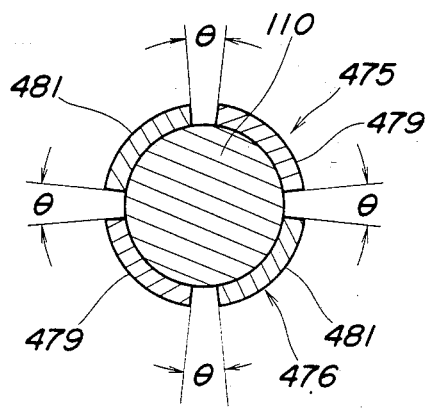
FIG. 38 is a cross-sectional view taken on line XXXVIII—XXXVIII.

A first boss 475 is rigidly secured to the output shaft 110 at a location below the output gear 107, as shown in FIG. 36. A second boss 476 is mounted on the output shaft 110 for rotation relative thereto at a location below the first boss 475, and a switch disc 477 is mounted on the output shaft 110 for rotation relative thereto at a location below the second boss 476. The second boss 476 is rigidly secured to the switch disc 477. As shown in FIG. 37, a pair of diametrically opposed recesses 478 each formed by a notch are formed in a lower peripheral edge of the first boss 475. A pair of projections 479 are interposed between the recesses 478, respectively. In addition, a pair of diametrically opposed recesses 480 each formed by a notch are formed in the second boss 476, and a pair of projections 481 are interposed between the recesses 480, respectively. Each of the projections 479 on the first boss 475 is inserted in a corresponding one of the recesses 480 in the second boss 476, and each of the projections 481 is inserted into a corresponding one of the recesses 478 in the first boss 475. As shown in FIG. 38, a gap of angle 20 is provided between each projection 479 on the first boss 475 and a corresponding one of the projections 481 on the second boss 476, and serves as stopping means (hysteresis imparting means) for retaining the switch disc 477 from angular movement together with the output gear 107 (output shaft 110) through a predetermined angular extent.

The printed circuit board 114 is mounted within the lower case 101b and is attached in substantially parallel with the bottom wall of the lower case 101b. The circuit board 114 is interposed between the output gear 107 and the switch disc 477. As shown in FIG. 36, the output shaft 110 and the first and second bosses 475 and 476 extend through a central hole 483 provided in the ciruit board 114 with a gap left between the central hole 483 and the bosses 475 and 476.

The output gear 107 has a lower side face to which movable contacts 485 are attached as shown in FIG. 36. Fixed contacts 486 with which the movable contacts 485 are in sliding contact are attached to the upper side face of the circuit board 114. These contacts 485 and 486 constitute a first switch device A.

As shown in FIG. 36, movable contacts 487 are attached to the upper side face of the switch disc 477, and fixed contacts 489 with which the movable contacts 487 are in sliding contact are attached to the lower side face of the circuit board 114. These contacts 487 and 489 constitute a second switch device B.

The first switch device A comprises contact portions which constitute a potentiometer for detecting the opening degree of the air-mix damper 8 in FIG. 1. These contact portions are incorporated in the electric circuit of the second motor actuator 18 in FIG. 1.

The second switch device B is incorporated in the electric circuit of the first motor actuator 5 for controlling the recirculated/fresh air selecting damper 4 in FIG. 1, the electric circuit of the third motor actuator 23 for controlling the mode selector dampers 10 and 11, the electric circuit of the thermoswitch mounted in the evaporator 7 for controlling the compressor 12, and the electric circuit of the blower motor 6a for controlling the blower 6.

Next, the operation of the fourth embodiment of the above construction is described below.

When the driving motor 104 is driven, the output gear 107 is rotated through the worm 105, the worm gear 106 and the gear train 103, so that the output shaft 110 rotates.

Rotation of the output gear 107 causes the first switch device A to be operated so that the second motor actuator 18 for controlling the air-mix damper 8 is self-controlled. This results in angular movement of the air-mix damper 8 from the full heat position to the full cool position or vice versa (refer to FIG. 39(e)).

Further, rotation of the output shaft 110 causes the switch disc 477 to also rotate. In this case, however, the gap of angle 2θ for obtaining the hysteresis is provided between each of the projections 479 on the first boss 475 and a corresponding one of the projections 481 on the second boss 476 and, therefore, the switch disc 477 does not rotate while the output shaft 110 is within the gap range of angle 2θ. The reason for this is that the switch disc 477 does not rotate if the rotational angle of the output gear 107 is within the gap range of angle 2θ, because the frictional force between the movable contacts 487 mounted on the switch disc 477 and the fixed contacts 489 of the circuit board 114 with which the movable contacts 487 are in sliding contact is higher than that between the second boss 476 and the output shaft 110.

As the rotational angle of the output gear 107 exceeds the gap range of angle 2θ so that the projections 479 on the first boss 475 of the output shaft 110 abut against the projections 481 on the second boss 476, the switch disc 477 is, for the first time, started to rotate together with the output shaft 110. Rotation of the switch disc 477 actuates the second switch device B so that the first and third motor actuators 5 and 23, the blower motor 6a and the thermoswitch are actuated to control the recirculated/fresh air selecting damper 4, the mode selector dampers 10 and 11, the blower 6 and the compressor 12.

Specifically, in the course of angular movement of the air-mix damper 8 from the full hot position toward the full cool position or vice versa as shown in FIG. 39(e), the recirculated/fresh air selecting damper 4 changes from the fresh air intake mode (i) to the recirculated air intake mode (ii) or vice versa, as shown in FIG. 39(a). The mode selector dampers 10 and 11 change from the foot mode (iii) in which air is blown toward feet of the passengers, to the mode (iv) in which the air is blown toward both feet and faces of the passengers as shown in FIG. 39(b) and, subsequently, the mode selector dampers 10 and 11 change to the mode (v) in which the air is blown toward the faces of the passengers, or in the opposite direction. Moreover, the thermoswitch is controlled so that the set values above and below which the compressor 12 is operated and stopped are changed over from 10° C. to 0° C., for example, or vice versa, as shown in FIG. 39(c). The rotational speed of the blower motor 6a changes from the moderately high (MH) speed to the high (Hi) speed through the moderately low (ML) speed, the low (Lo) speed, the moderately low (ML) speed and the moderately high (MH) speed, for example, or vice versa, as shown in FIG. 39(d).

Because of the provision of the gap of angle 2θ between each of the projections 479 on the first boss 475 and a corresponding one of the projections 481 on the second boss 476, the switch disc 477 is maintained unmoved within the gap range of 2θ. This causes a blind band S to occur at each change-over point of the characteristic lines (a), (b), (c) and (d) illustrated in FIG. 39.

Figure 39:
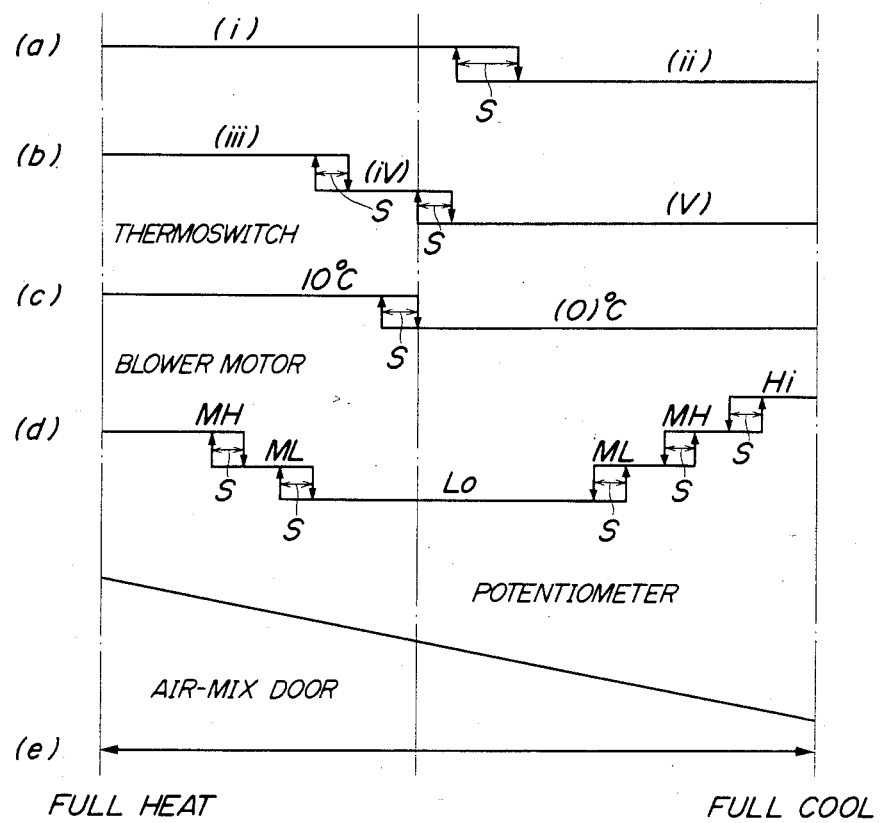
FIG. 39 is a graph showing an example of the operation of the air conditioning system for automotive vehicles by the use of the motor actuator according to the fourth embodiment of the invention.

Specifically, as will be seen from the characteristic lines (a), (b), (c) and (d) of FIG. 39, differences occur between the change-over points of time of the modes controlled during movement of the air-mix damper from the full heat (Full Heat) position toward the full cool (Full Cool) position as indicated by the characteristic line (e) in FIG. 39, and those of the modes controlled during reverse movement of the air-mix damper 8 from the full cool position toward the full heat position.

Accordingly, by the provision of the blind band S at each change-over point of the modes as described above, even if the air-mix damper 8 moves within a range corresponding to the blind band S, the change-over operation of the recirculated/fresh air selecting damper 4, the mode selector dampers 10 and 11, the blower 6 and the compressor 12 does not take place frequently. Thus, hunting of these components does not occur.

Incidentally, in FIG. 36, it is possible to dispose only the second switch device B between the circuit board 114 and the switch disc 477.

In this case, the grease to be supplied to the output gear 107 is blocked by the circuit board 114 and is prevented from penetrating into the second switch device B.

Moreover, although the contact pattern for connection to connectors (not shown) is printed on the lower side face of the circuit board 114, a single-sided printed circuit board can be used as the circuit board 114, because the second switch device B is located below the circuit board 114 as described above so that the fixed contacts 489 of the second switch device B are located ion the lower side face of the circuit board 114.

As described above in detail, according to the fourth embodiment, the provision of the output gear 107 mounted on the output shaft 110, the switch disc 477 interlocked with the output gear 107 and the circuit board 114 interposed between the output gear 107 and the switch disc 477, enables a switch device to be provided, as occasion demands, at one or each of a location between the output gear 107 and the circuit board 114 and a location between the switch disc 477 and the circuit board 114.

Thus, if the switch device is provided at only one of the above locations, for example, it is sufficient if only one side of the circuit board is formed as a printing side. This results in reduction in the manufacturing cost. If the switch device is provided on each of the above locations, the circuits in the motor actuators become twice in number as compared with those in the conventonal circuit board in which circuits are provided at only one side thereof. This leads to simplificaton of the control circuits correspondingly, and to reduction in the manufacturing cost.

Moreover, the provision of the stopping means (hysteresis imparting means) for stopping the switch disc within a predetermined range makes it possible to positively prevent hunting of the driven devices. This avoids the particular necessity of provision of control circuits for preventing such hunting, in the control circuits of the air conditioning system for vehicles, to thereby result in simplification of the construction and to reduction in the manufacturing cost.

Furthermore, according to the fourth embodiment, since the switch device is arranged below the circuit board, the fixed contacts of the switch device are provided on the lower side face of the circuit board. This enables contacts for connection to the connectors, for example, and the fixed contacts to be present on the same face (lower side face), making it possible to employ a single-sided printed circuit board. Thus, the manufacturing cost can be reduced. In addition, the location of the switch device below the circuit board enables the circuit board to prevent the grease for gear lubrication from penetrating into the switch device.

What is claimed is:

1. A motor actuator for an air conditioning system, comprising:
    a driving motor;
    an output shaft rotated by a driving force from said driving motor;
    contact mounting means rotatable together with said output shaft;
    movable contact means mounted on said contact mounting means;
    a fixed circuit board;
    fixed contact means mounted on said circuit board;
    said movable contact means being arranged in sliding contact with said fixed contact means so as to be slidable over said fixed contact means; and
    hysteresis imparting means arranged between said output shaft and said contact mounting means for making said contact mounting means angularly movable relative to said output shaft to thereby impart a predetermined hysteresis to the sliding of said movable contact means over said fixed contact means.

2. A motor actuator as defined in claim 1, wherein said contact mounting means comprises a first member rotatable together with said output shaft, and a second member having said movable contact means mounted thereon, and wherein said hysteresis imparting means comprises means for rendering said second member rotatable relative to said first member through a predetermined angle.

3. A motor actuator as defined in claim 1, wherein said contact mounting means comprises a first member rotatable together with said output shaft, and wherein said hysteresis imparting means comprises a groove formed in said first member and extending in a rotational direction of said first member, and a second member fitted in said groove for movement therein through a predetermined distance, said movable contact means being mounted on said second member.

4. A motor actuator as defined in claim 3, wherein each of said groove and said second member has opposite arcuate end faces, the arcuate end faces of said groove having a radius of curvature greater than that of the arcuate end faces of said second member.

5. A motor actuator as defined in claim 3 or claim 4, wherein at least one of said groove and said second member has at least one protuberance sliding on at least the other of said groove and said second member.

6. A motor actuator as defined in claim 3 or claim 4, including at least one resilient member interposed between said circuit board and said second member.

7. A motor actuator as defined in claim 3 or claim 4, including at least one engaging hole formed in said circuit board and at least one engaging leg mounted on said movable contact means and extending therefrom, said at least one engaging leg being engageable with said at least one engaging hole.

8. A motor actuator as defined in claim 3 or claim 4, including at least one sliding pawl mounted on said second member for sliding movement on said circuit board.

9. A motor actuator as defined in claim 3 or claim 4, including at least one engaging hole formed in said circuit board, and at least one engaging leg mounted on said second member and extending therefrom, said at least one engaging leg being engageable with said at least one engaging hole.

10. A motor actuator as defined in claim 1, wherein said contact mounting means includes a first member rotatable together with sad output shaft, and wherein said hysteresis imparting means comprises a sectorial recess formed in said first member, and a sectorial second member fitted in said sectorial recess for angular movement therein through a predetermined angle, said movable contact means being mounted on said second member.

11. A motor actuator as defined in claim 10, including detent means for retaining said second member at a plurality of predetermined angular positions with respect to said first member.

12. A motor actuator as defined in claim 11, wherein said second member has a peripheral edge portion, and wherein said detent means comprises a plurality of recesses arranged circumferentially in said peripheral edge portion and a fixed engaging member having an engaging protuberance engageable with said recesses.

13. A motor actuator for an air conditioning system, comprising:
a driving motor;
an output shaft rotated by a driving force from said driving motor;
contact mounting means rotatable together with said output shaft;
movable contact means mounted to said contact mounting means;
a fixed circuit board;
fixed contact means mounted on said circuit board;
said movable contact means being arranged in sliding contact with said fixed contact means so as to be slidable over said fixed contact means;
hysteresis imparting means arranged between said output shaft and said contact mounting means for making said contact mounting means angularly movable relative to said output shaft to thereby impart a predetermined hysteresis to the sliding of said movable contact means over said fixed contact means; and
means for varying the magnitude of said hysteresis, imparted by said hysteresis imparting means, in response to angular position of said output shaft.

14. A motor actuator as defined in claim 13, wherein said hysteresis imparting means comprises a member rotatable together with said output shaft and displaceable axially relatively to said contact mounting means, at least one engaging groove provided in one of said member and said contact mounting means, and at least one inclined engaging pawl provided on the other of said member and said contact mounting means and engageable with said at least one engaging groove with a circumferential gap left between said at least one engaging groove and said at least one engaging pawl, and wherein said means for varying the magnitude of said hysteresis comprises cam means provided on said member for axially displacing same relatively to said contact mounting means in response to a change in the angular position of said output shaft.

15. A motor actuator for an air conditioning system, comprising:
a driving motor;
an output shaft rotated by a driving force from said driving motor;
an output gear mounted on said output shaft;
a switch disc arranged in concentric relation to said output shaft and rotatable together with said output shaft;
a circuit board interposed between said output gear and said switch disc;
switch means provided on said circuit board and at least one of said output gear and said switch disc; and
hysteresis imparting means for imparting a hysteresis to the rotation of said switch disc with respect to the rotation of said output shaft.

16. A motor actuator as defined in claim 15, wherein said switch means comprises first switch means provided between said output gear and said circuit board, said first switch means comprising first movable contact means provided on said output gear and first fixed contact means provided on said circuit board, said first movable contact means being in sliding contact with said first fixed contact means, and second switch means provided between said switch disc and said circuit board, said second switch means comprising second movable contact means provided on said switch disc and second fixed contact means provided on said circuit board, said second movable contact means being in sliding contact with said second fixed contact means.

17. A motor actuator for an air conditioning system, comprising:
a driving motor;
an output shaft rotated by a driving force from said driving motor, said output shaft extending substantially vertically;
an output gear mounted on said output shaft;
a switch disc arranged below said output gear in concentric relation thereto and rotatable together with said output gear;
a circuit board interposed between said output gear and said switch disc;
switch means arranged between said circuit board and said switch disc and including movable contact means mounted on an upper side face of said switch disc and fixed contact means mounted on a lower side face of said circuit board, said movable contact means being in sliding contact with said fixed contact means so as to be slidable over said fixed contact means; and
hysteresis imparting means for retaining said switch disc from angular movement together with said output gear through a predetermined angular extent to thereby impart a hysteresis to the rotation of said movable contact means mounted on said upper side face of said switch disc with respect to the rotation of said output shaft.

* * * * *